US012789688B2

(12) United States Patent
Muto et al.

(10) Patent No.: US 12,789,688 B2
(45) Date of Patent: Nov. 10, 2026

(54) VEHICLE STEERING APPARATUS

(71) Applicant: Panasonic Automotive Systems Co., Ltd., Kanagawa (JP)

(72) Inventors: Kanji Muto, Kanagawa (JP); Tsuyoshi Tanaka, Kyoto (JP); Kensuke Maruya, Kanagawa (JP); Yuya Yamasaki, Fukuoka (JP); Masaki Tada, Osaka (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 40 days.

(21) Appl. No.: 19/261,568

(22) Filed: Jul. 7, 2025

(65) Prior Publication Data

US 2026/0034924 A1 Feb. 5, 2026

(30) Foreign Application Priority Data

Jul. 31, 2024 (JP) ................................ 2024-125179

(51) Int. Cl.

| | |
|---|---|
| ***B60N 3/00*** | (2006.01) |
| ***B60Q 9/00*** | (2006.01) |
| ***B62D 1/04*** | (2006.01) |
| ***B62D 1/08*** | (2006.01) |
| ***B62D 1/12*** | (2006.01) |
| ***B62D 1/183*** | (2006.01) |

(52) U.S. Cl.

CPC ............... *B60N 3/005* (2013.01); *B60Q 9/00* (2013.01); *B62D 1/046* (2013.01); *B62D 1/08* (2013.01); *B60N 2210/40* (2023.08)

(58) Field of Classification Search

CPC ........ B60N 3/001; B60N 3/002; B60N 3/005; B60N 2210/40; B60Q 9/00; B62D 1/04; B62D 1/046; B62D 1/08

USPC .......................................................... 280/775

See application file for complete search history.

(56) References Cited

U.S. PATENT DOCUMENTS

| | | | | |
|---|---|---|---|---|
| 11,292,415 | B2 * | 4/2022 | Mimura | B60R 21/203 |
| 11,642,995 | B1 * | 5/2023 | Huang | A47B 13/081 108/144.11 |
| 12,208,760 | B1 * | 1/2025 | Llamazares Domper | B60N 2/06 |
| 2016/0325662 | A1 * | 11/2016 | Nash | B62D 1/04 |
| 2017/0158055 | A1 * | 6/2017 | Kim | B60K 35/10 |
| 2019/0322306 | A1 * | 10/2019 | Lubischer | B60N 3/00 |
| 2020/0283054 | A1 | 9/2020 | Murayama et al. | |

(Continued)

FOREIGN PATENT DOCUMENTS

| | | | | |
|---|---|---|---|---|
| CN | 117124959 A | * 11/2023 | B60N 3/001 |
| CN | 118894040 A | * 11/2024 | B60N 3/001 |
| JP | 2020142539 A | 9/2020 | |

OTHER PUBLICATIONS

Description Translation for CN 11889404 from Espacenet (Year: 2024).*

*Primary Examiner* — Daniel M. Keck

(74) *Attorney, Agent, or Firm* — Seed Intellectual Property Law Group LLP

(57) ABSTRACT

A vehicle steering apparatus includes a pair of grips, a table storable in a column cover, a sensor provided on the table, a first actuator that deploys the table from the column cover and stores the table in the column cover, and a controller that controls the first actuator. The pair of grips are rotatable relative to the spoke. When the sensor detects an object placed on the table, the first actuator is not actuated.

20 Claims, 14 Drawing Sheets

(56) References Cited

U.S. PATENT DOCUMENTS

| | | | | |
|---|---|---|---|---|
| 2021/0316686 | A1* | 10/2021 | Inoue | B62D 1/18 |
| 2022/0001827 | A1* | 1/2022 | Kring | B60K 35/60 |
| 2026/0014870 | A1* | 1/2026 | Han | B60K 35/60 |

* cited by examiner

VEHICLE STEERING APPARATUS

CROSS REFERENCE TO RELATED APPLICATIONS

The present application is based on and claims priority of Japanese Patent Application No. 2024-125179 filed on Jul. 31, 2024.

FIELD

The present disclosure relates to a vehicle steering apparatus provided on a steering wheel of a vehicle.

BACKGROUND

Patent Literature (PTL) 1 discloses a vehicle steering apparatus that includes a lateral movement mechanism for moving a steering wheel between an operative position set forward of the driver's seat and an evasive position set forward of the passenger seat, and a controller to control the operation of the lateral movement mechanism. In this vehicle steering apparatus, switching between manual steering and autonomous steering is possible. When switching from manual steering to autonomous steering, the controller moves the steering wheel from the operative position to the evasive position, thereby expanding the foot space in front of the driver's seat.

CITATION LIST

Patent Literature

PTL 1: Japanese Unexamined Patent Application Publication No. 2020-142539

SUMMARY

Technical Problem

However, the vehicle steering apparatus according to PTL 1 can be improved upon.

In view of this, the present disclosure provides a vehicle steering apparatus capable of further improving upon the above related art.

Solution to Problem

A vehicle steering apparatus according to one aspect of the present disclosure includes: a spoke of a steering wheel of a vehicle; a pair of grips, one of which is disposed on a left portion of the spoke and another of which is disposed on a right portion of the spoke, each shaped in an arc or straight line; a table storable in a column cover that covers a bottom of a steering column; a sensor provided on the table; a first actuator that actuates the table to move the table from the steering column toward a rear of the vehicle to deploy the table from the column cover, and actuates the table to move the table toward a front of the vehicle to store the table in the column cover; and a controller that controls the first actuator, wherein the pair of grips are rotatable relative to the spoke, and the controller: controls actuation of the first actuator to move the table from the steering column toward the rear of the vehicle when the vehicle is parked; controls actuation of the first actuator to move the table toward the front of the vehicle to store the table in the column cover during driving of the vehicle or when a driver enters or exits the vehicle; and does not actuate the first actuator when the sensor detects an object placed on the table.

Advantageous Effects

A vehicle steering apparatus according to the present disclosure is capable of improving upon the above related art.

BRIEF DESCRIPTION OF DRAWINGS

These and other advantages and features of the present disclosure will become apparent from the following description thereof taken in conjunction with the accompanying drawings that illustrate a specific embodiment of the present disclosure.

DESCRIPTION OF EMBODIMENT(S)

Hereinafter, one or more embodiments of the present disclosure will be described in detail with reference to the drawings.

The embodiments described below each illustrate a general or specific example of the present disclosure. The numerical values, shapes, materials, elements, the arrangement and connection of the elements, etc., shown in the following embodiments are mere examples, and therefore do not limit the scope of the present disclosure. Accordingly, among the elements in the following embodiments, those not recited in any of the independent claims are described as optional elements.

Note that the figures are schematic illustrations and are not necessarily precise depictions. In the figures, elements that are the same share the same reference signs.

In the following embodiments, expressions such as "rod-shaped" and "horizontal direction" are used. For example, the terms "rod-shaped" and "horizontal direction" do not only refer to exactly rod-shaped and precisely horizontal, but also to shapes substantially similar to a rod and directions substantially similar to the horizontal direction, that is, including variations of about a few percent. Moreover, the terms "rod" and "horizontal direction" refer to rods and horizontal directions to the extent that the advantageous effects of the present disclosure can be achieved. The same applies to other expressions using "shape" or "direction".

EMBODIMENT

Configuration and Function in Automatic Mode

First, vehicle steering apparatus 1 according to the present embodiment will be described with reference to FIG. 1 through FIG. 3B.

Figure 1:
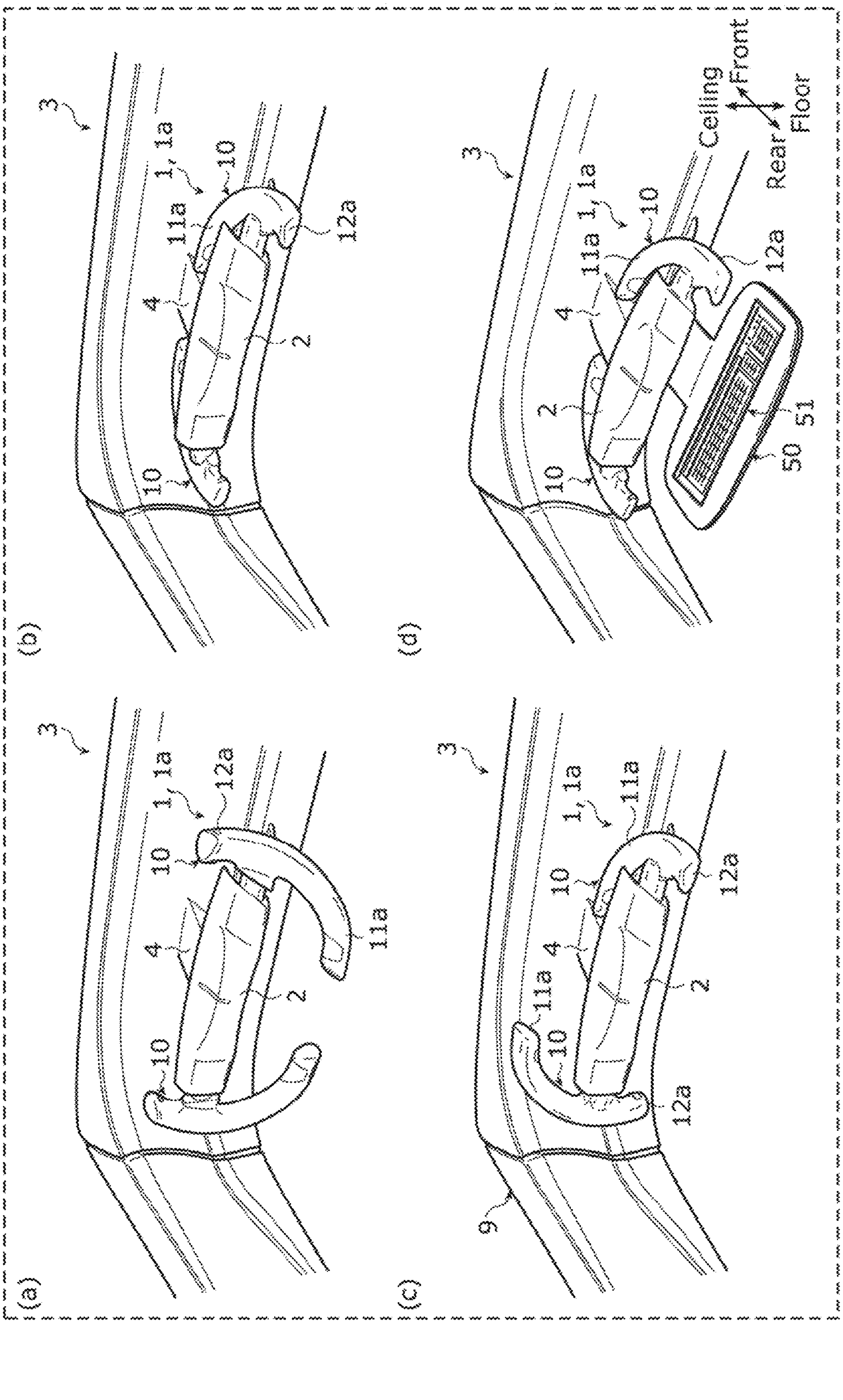
FIG. 1 is a perspective view illustrating a vehicle steering apparatus including a pair of automatically rotatable grips.
Figure 2:
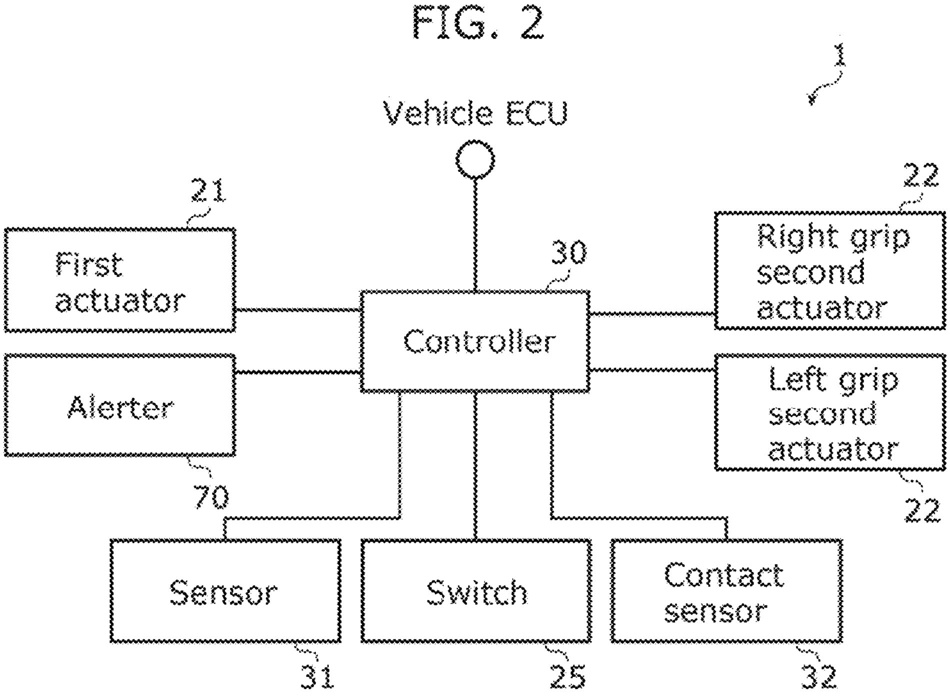
FIG. 2 is a block diagram illustrating a vehicle steering apparatus including a pair of automatically rotatable grips.
Figure 3A:
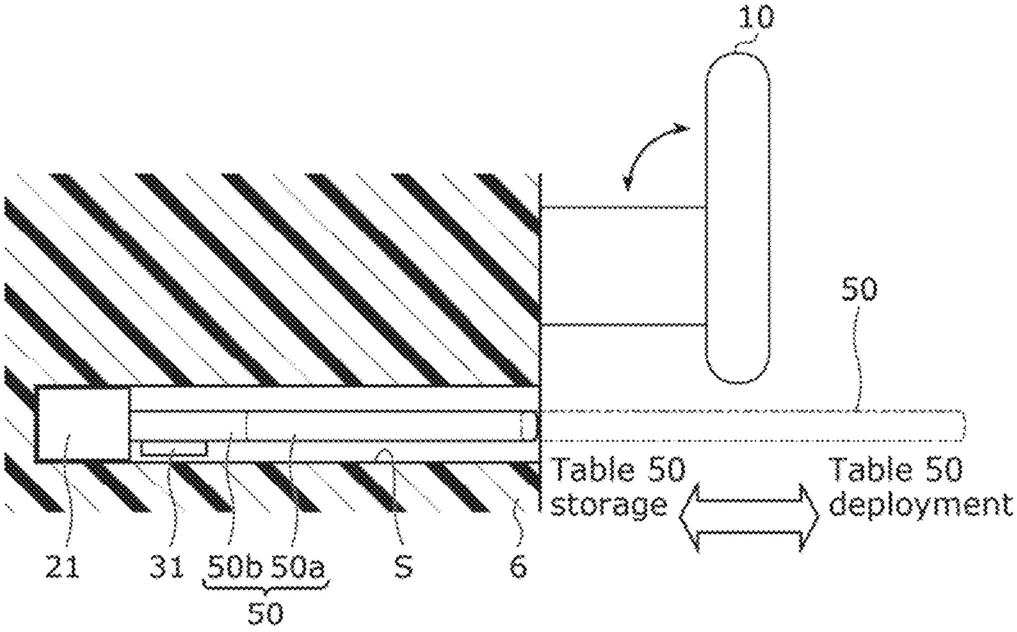
FIG. 3A illustrates a table in two states, namely, stored inside a column cover and deployed from the column cover.
Figure 3B:
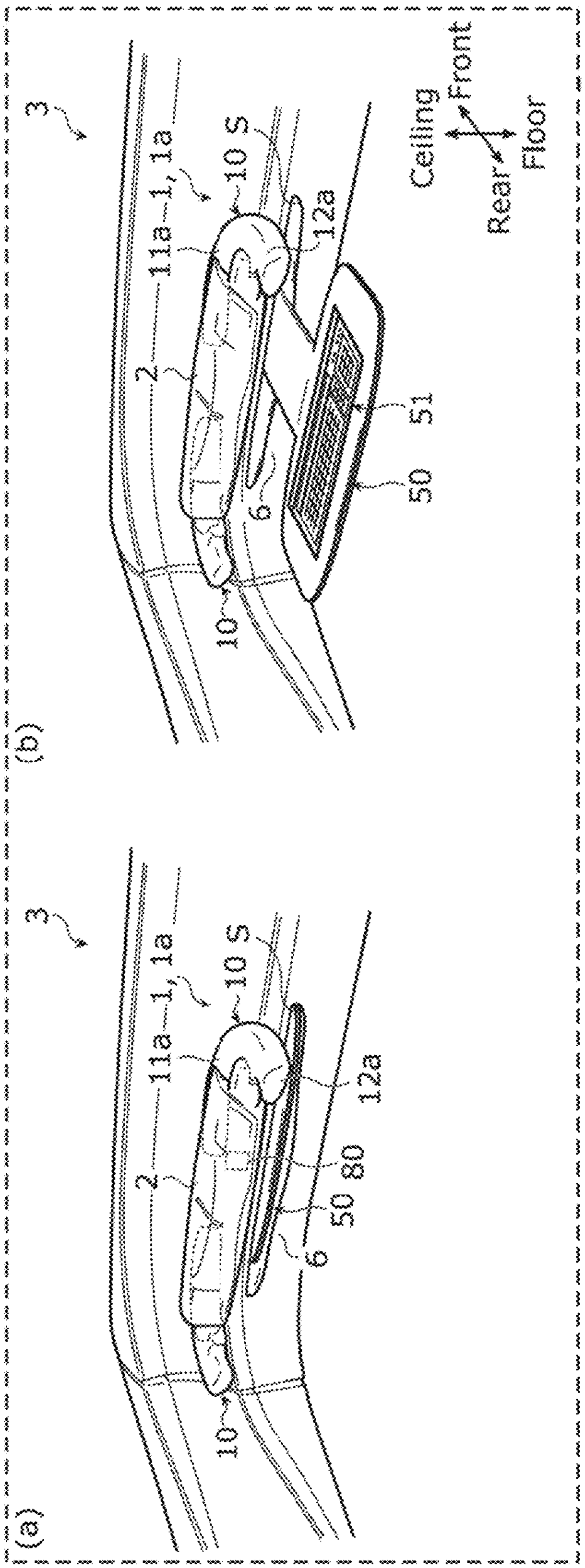
FIG. 3B is a perspective view illustrating different states of a table in a vehicle steering apparatus including a pair of automatically rotatable grips.

FIG. 1 is a perspective view illustrating vehicle steering apparatus 1 including a pair of automatically rotatable grips 10. In FIG. 1, (a) illustrates vehicle steering apparatus 1 when the steering position during driving is in the neutral position. In FIG. 1, (b) illustrates vehicle steering apparatus 1 with the pair of grips 10 laid flat horizontally. In FIG. 1, (c) illustrates vehicle steering apparatus 1 with grip 10 adjacent to door 9 of vehicle 3 adjacent to vehicle steering apparatus 1 standing vertically, and the other grip 10 laid flat horizontally. In FIG. 1, (d) illustrates vehicle steering apparatus 1 with the pair of grips 10 laid flat horizontally and table 50 deployed. FIG. 2 is a block diagram illustrating vehicle steering apparatus 1 including a pair of automatically rotatable grips 10. FIG. 3A illustrates table 50 in two states, namely, stored inside column cover 6 and deployed from column cover 6. In FIG. 3A, the state of table 50 deployed from column cover 6 is indicated by two-dot chain lines. FIG. 3B is a perspective view illustrating different states of table 50 in vehicle steering apparatus 1 including a pair of automatically rotatable grips 10. In FIG. 3B, (a) illustrates vehicle steering apparatus 1 with the pair of grips 10 laid flat horizontally, and table 50 stored in storage space S in column cover 6 that covers the bottom of steering column 4. In FIG. 3B, (b) illustrates vehicle steering apparatus 1 with the pair of grips 10 laid flat horizontally, and table 50 deployed from storage space S in column cover 6.

FIG. 1 and the like illustrate an example in which vehicle steering apparatus 1 is provided in vehicle 3 in which the driver's seat is on the left hand side relative to the direction of travel. Note that vehicle steering apparatus 1 according to the present disclosure may be provided in vehicle 3 in which the driver's seat is on the right hand side relative to the direction of travel.

Vehicle steering apparatus 1 is an apparatus capable of applying a steering angle to the steered wheels of vehicle 3, and is capable of changing the orientation of grips 10 on the steering wheel in front of the driver's seat of vehicle 3.

More specifically, as illustrated in FIG. 1 and FIG. 2, vehicle steering apparatus 1 includes table 50, controller 30, first actuator 21, sensor 31, alerter 70, switch 25, contact sensor 32, spoke 2, a pair of grips 10, a pair of second actuators 22, and.

As illustrated in (d) in FIG. 1, FIG. 2, FIG. 3A, and FIG. 3B, table 50 is disposed below the steering wheel and is capable of moving in the front and rear directions of vehicle 3. Table 50 is storable in storage space S in column cover 6 that covers the bottom of steering column 4. Table 50 deploys from storage space S in column cover 6 so as to move closer to the driver's seat.

Table 50 further includes input interface 51. Input interface 51 is a touch pad, a touch panel, or a projection keyboard. When input interface 51 is a touch pad or a touch panel, it is provided in table 50. The projection keyboard may be realized by a projection device arranged on, for example, spoke 2, projecting an image of a keyboard onto the surface of table 50 and a detector arranged on, for example, spoke 2, detecting the positions of the driver's fingers.

Figure 4A:
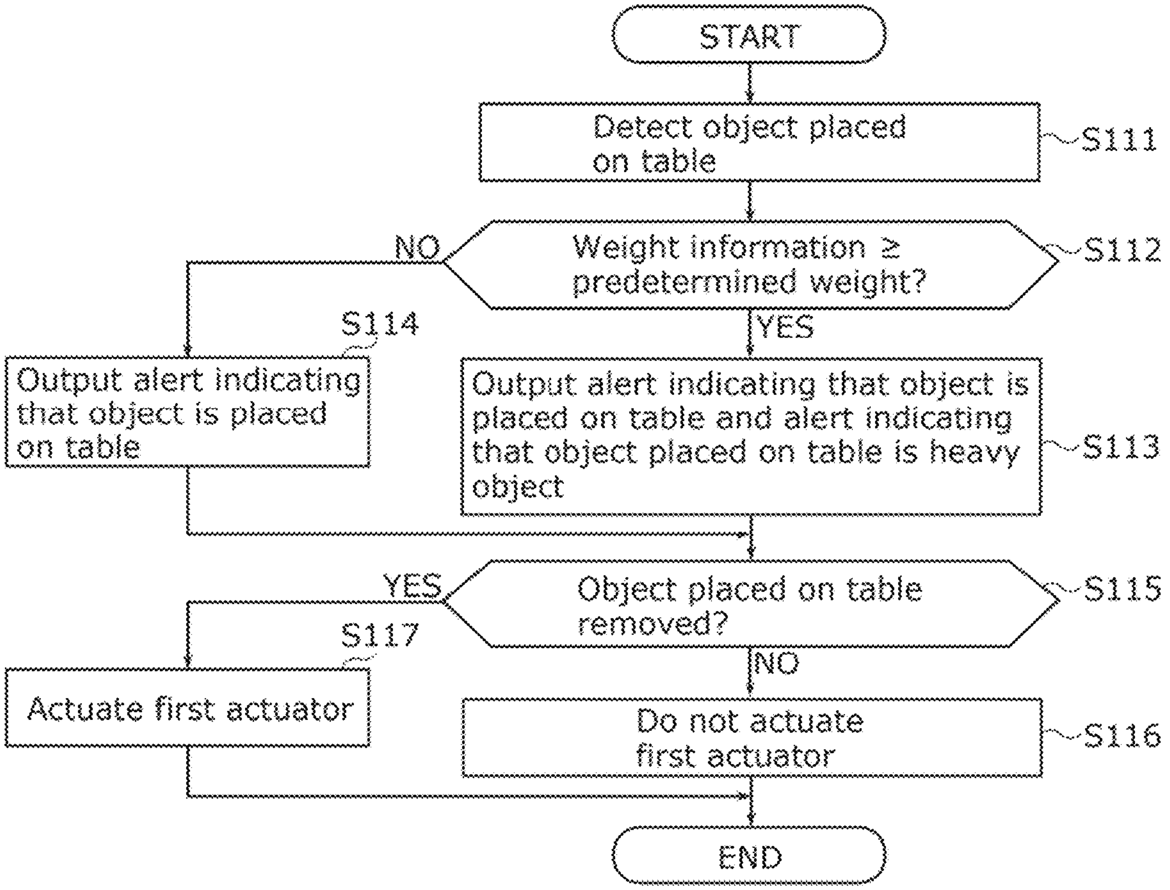
FIG. 4A is a flowchart illustrating Operation Example 1 of the vehicle steering apparatus.
Figure 4B:
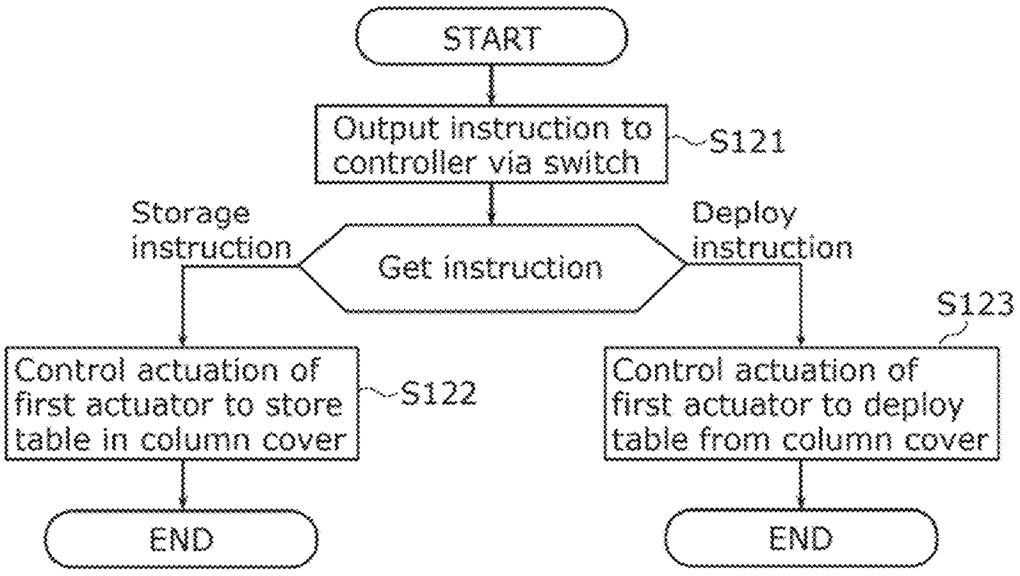
FIG. 4B is a flowchart illustrating Operation Example 2 of the vehicle steering apparatus.
Figure 4C:
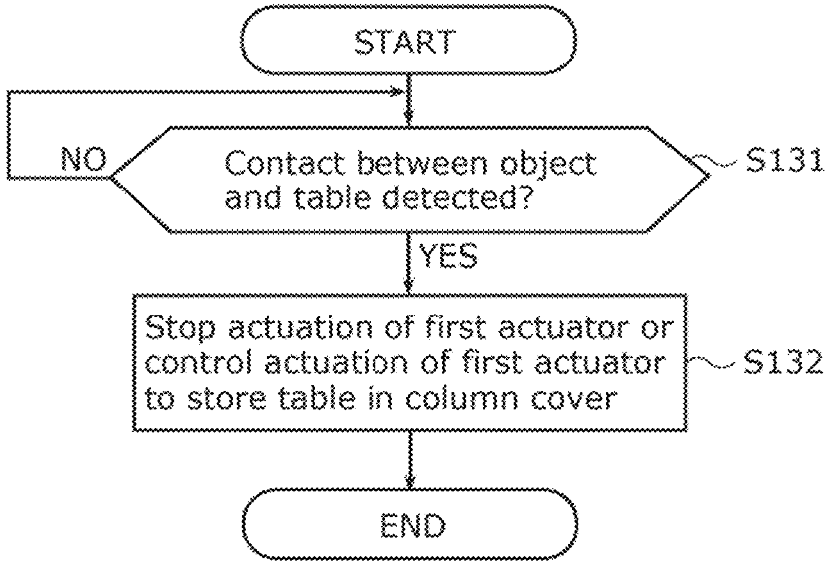
FIG. 4C is a flowchart illustrating Operation Example 3 of the vehicle steering apparatus.
Figure 4D:
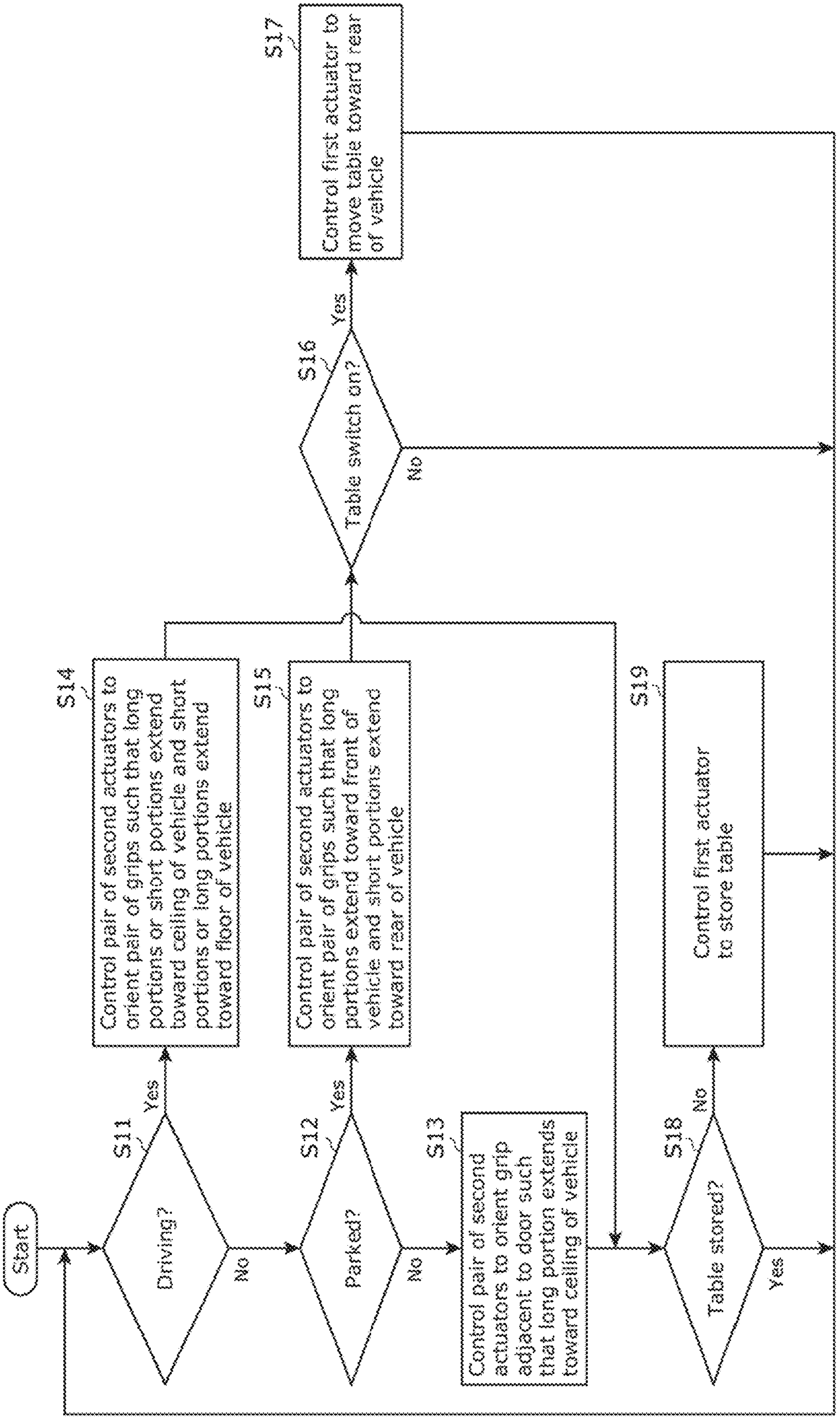
FIG. 4D is a flowchart illustrating a vehicle steering apparatus including a pair of automatically rotatable grips.

Controller 30, as illustrated in FIG. 4D (to be described later), controls first actuator 21 to move table 50 from steering column 4 toward the rear of vehicle 3 when parked. While the driver is driving vehicle 3 or when the driver is entering or exiting vehicle 3, controller 30 controls first actuator 21 to move table 50 toward the front of vehicle 3 so as to store table 50 in storage space S in column cover 6.

When the driver is entering or exiting vehicle 3 and sensor 31 detects an object placed on table 50, controller 30 does not actuate first actuator 21.

First actuator 21 is configured as a drive mechanism such as an electric motor that actuates table 50 so as to move table 50 in the front and rear directions of vehicle 3. More specifically, first actuator 21 is controlled by controller 30 so that when it actuates table 50 to move table 50 from steering column 4 towards the rear of vehicle 3, it protrudes table 50 from column cover 6 and positions table 50 directly in front of the driver's seat. First actuator 21, under control by controller 30, actuates table 50 so as to move table 50 toward the front of vehicle 3 and store table 50 in storage space S in column cover 6.

Here, sensor 31 is provided on table 50 and can detect an object placed on table 50. For example, sensor 31 is a weight sensor or camera sensor or the like.

For example, as illustrated in FIG. 3A, when sensor 31 is a weight sensor, the weight sensor is disposed near first actuator 21 coupled to table 50. More specifically, when table 50 includes table body 50*a* on which an object is placeable, and coupling 50*b* that is coupled to table body 50*a* and first actuator 21 and is moved by first actuator 21, the weight sensor is disposed on coupling 50*b*. In such cases, coupling 50*b* bends under the weight of the object placed on table body 50*a*, and the strain gauge of the weight sensor can detect this bending. In particular, since stress imparted by the object concentrates on coupling 50*b*, which corresponds to the attachment portion of table 50, it is expected that disposing the weight sensor on this coupling 50*b* will improve the detection sensitivity for objects placed on table 50.

For example, when sensor 31 is a camera sensor, the camera sensor is disposed so as to enable capturing of an image of the surface of table 50. For example, since the camera sensor is capable of capturing an image of the surface of table 50, it can detect an object placed on the surface of table 50 using image recognition technology.

Sensor 31 outputs a detection result indicating that an object is placed on table 50 to controller 30.

Controller 30 is further capable of controlling alerter 70. Under control by controller 30, alerter 70 outputs an alert based on the detection result from sensor 31. More specifically, when sensor 31 detects an object placed on table 50, under control by controller 30, alerter 70 outputs an alert indicating that an object is placed on table 50 without actuating first actuator 21.

When the output of sensor 31 is greater than or equal to a predetermined output, controller 30 may cause alerter 70 to output an alert. For example, when sensor 31 is a weight sensor, when the output of the weight sensor is greater than or equal to a predetermined weight, controller 30 may cause alerter 70 to output an alert indicating that the object is a heavy object. Stated differently, when a heavy object is placed on table 50, controller 30 may cause alerter 70 to output an alert indicating that table 50 is overloaded.

The alerts are performed by voice output, light output, vibration of grip 10 on the steering wheel, vibration of the seat, or display on an in-vehicle monitor. Voice output is realized by an audio device such as a loudspeaker equipped in vehicle 3. Light output is realized by in-vehicle lighting or a display device equipped in vehicle 3. Vibration is realized by a vibrator or the like equipped in grip 10 or seat.

Note that since the alert indicating that the object is a heavy object is different from the alert indicating that an object is placed on table 50, different alert patterns can be created. For example, the alerts may be differed such that the alert indicating that the object is a heavy object is performed by one of voice output, light output, vibration of grip 10 on the steering wheel, vibration of the seat, or display on an in-vehicle monitor, and the alert indicating that an object is placed on table 50 is performed using a different alert pattern.

When sensor 31 detects an object placed on table 50 after alerter 70 outputs an alert, controller 30 does not need to actuate first actuator 21.

Alerter 70 is, for example, an audio device or a display device that is equipped in vehicle 3. The alert is, for example, a sound output by the audio device that prompts storage of table 50 or display content displayed by the display device that prompts storage of table 50.

Switch 25 is capable of outputting an instruction to controller 30. Instructions output to controller 30 include a storage instruction and a deploy instruction. The storage instruction is an instruction for controlling actuation of first actuator 21 to move table 50 toward the front of vehicle 3 so as to store table 50 in column cover 6 (i.e., a storage signal). The deploy instruction is an instruction for controlling actuation of first actuator 21 to move table 50 from steering column 4 toward the rear of vehicle 3 so as to deploy table 50 from column cover 6 (i.e., a deploy signal). Sensor 31 detects that an object is placed on table 50, and even when controller 30 performs control so as not to actuate first actuator 21, controller 30 prioritizes and executes the storage instruction and deploy instruction over the detection by sensor 31. Stated differently, when controller 30 attempts to control first actuator 21 to move table 50 from steering column 4 toward the rear of vehicle 3 when parked or to move table 50 toward the front of vehicle 3 into storage space S in column cover 6 during driving or while the driver is entering or exiting vehicle 3, and sensor 31 detects an object on table 50 and causes alerter 70 to output a warning indicating that an object is on table 50 without actuating first actuator 21, even if there is no actual object on table 50 but sensor 31 continues to detect one due to a false detection or malfunction, controller 30 can prioritize and execute the storage instruction and deploy instruction.

Therefore, when a storage instruction is output from switch 25 as a result of the driver operating switch 25 to store table 50, controller 30 controls actuation of first actuator 21 to move table 50 toward the front of vehicle 3 so as to store table 50 in column cover 6. When a deploy instruction is output from switch 25 as a result of the driver operating switch 25 to deploy table 50, controller 30 controls actuation of first actuator 21 to move table 50 from steering column 4 toward the rear of vehicle 3 so as to deploy table 50 from column cover 6.

Contact sensor 32 detects contact between an object and table 50. More specifically, when table 50 is actuated to move from steering column 4 toward the rear of vehicle 3 so as to be deployed from column cover 6, if table 50 comes into contact with an obstacle, contact sensor 32 can detect this contact between table 50 and the obstacle. At this time, controller 30 stops actuating first actuator 21, or controls actuation of first actuator 21 to move table 50 toward the front of vehicle 3 so as to store table 50 in column cover 6.

Contact sensor 32 is, for example, disposed on the outer peripheral edge of table 50, and detects contact between an obstacle and table 50.

Contact sensor 32 is, for example, a current sensor that measures the current imposed on the electric motor of first actuator 21 by an obstacle contacting table 50.

Spoke 2 is a rod-shaped component that is coupled to steering column 4 and extends left and right from steering column 4 when the steering position during driving is in the neutral position. Note that the neutral steering position refers to a state in which spoke 2 is orientated parallel to the left and right directions (horizontal direction) so that vehicle 3 can travel straight forward.

The pair of grips 10 are arranged on both ends of spoke 2 in the left and right directions. In other words, the pair of grips 10 are arranged on the left and right of spoke 2. Each grip 10 is arc-shaped. Although the pair of grips 10 are exemplified as being arc-shaped in the present embodiment, the pair of grips 10 are not limited to this example, and may be in the shape of a straight line.

The pair of grips 10 are rotatable relative to spoke 2. The pair of grips 10 are automatically rotatable relative to spoke 2 via the pair of second actuators 22 under control by controller 30. The pair of grips 10 are separated and independently rotatable about an axis extending in the left and right directions of spoke 2. Accordingly, the pair of grips 10 are capable of independently rotating about an axis extending in the left and right directions of spoke 2.

Each grip 10 includes a first portion and a second portion.

The first portion is a portion extending in toward the ceiling of vehicle 3 relative to spoke 2 when the steering position during driving is in the neutral position.

The second portion is a portion extending toward the floor of vehicle 3 relative to spoke 2 when the steering position during driving is in the neutral position.

In each grip 10, when the steering position during driving is in the neutral position, the length of the first portion and the length of the second portion are different. Here, the longer of the first portion and the second portion will be referred to as long portion 11*a*, and the shorter will be referred to as short portion 12*a*. Although (a) in FIG. 1 illustrates an example in which long portion 11*a* extends toward the floor of vehicle 3 and short portion 12*a* extends toward the ceiling of vehicle 3 as the neutral position, the neutral position is not limited to this example. For example, long portion 11*a* may extend toward the ceiling of vehicle 3 and short portion 12*a* may extend toward the floor of vehicle 3 as the neutral position. Accordingly, when the first portion is long portion 11*a*, the second portion is short portion 12*a*, and when the first portion is short portion 12*a*, the second portion is long portion 11*a*.

As illustrated in (a) in FIG. 1, each grip 10 is capable of rotating such that, while driving, short portion 12*a* is positioned toward the ceiling of vehicle 3 relative to spoke 2 and long portion 11*a* is positioned toward the floor of vehicle 3 relative to spoke 2. Stated differently, since each grip 10 is rotatable relative to spoke 2, it is possible for each grip 10 to assume an orientation in which long portion 11*a* extends toward the floor of vehicle 3 relative to spoke 2 and short portion 12*a* extends toward the ceiling of vehicle 3 relative to spoke 2. Note that each grip 10 may be capable of rotating such that, while driving, short portion 12*a* is positioned toward the floor of vehicle 3 relative to spoke 2 and long portion 11*a* is positioned toward the ceiling of vehicle 3 relative to spoke 2.

Since each grip 10 is rotatable relative to spoke 2, each grip 10 can rotate such that, while parked, short portion 12*a* is positioned toward the rear of vehicle 3 relative to spoke 2 and long portion 11*a* is positioned toward the front of vehicle 3 relative to spoke 2, as illustrated in (b) in FIG. 1. Stated differently, since each grip 10 is rotatable relative to spoke 2, it is possible for each grip 10 to assume an orientation in which short portion 12*a* extends toward the rear of vehicle 3 relative to spoke 2 and long portion 11*a* extends toward the front of vehicle 3 relative to spoke 2.

As illustrated in (c) in FIG. 1, while the driver enters or exits vehicle 3, among the pair of grips 10, grip 10 adjacent to door 9 of vehicle 3 adjacent to vehicle steering apparatus 1 can be oriented such that long portion 11*a* is positioned toward the ceiling of vehicle 3 relative to spoke 2 and short portion 12*a* is positioned toward the floor of vehicle 3 relative to spoke 2 so as to allow the driver to enter or exit vehicle 3 while holding grip 10. At this time, the other grip 10 can be oriented such that short portion 12*a* extends toward the rear of vehicle 3 and long portion 11*a* extends toward the front of vehicle 3.

Although long portion 11*a* is exemplified as extending toward the ceiling of vehicle 3 and short portion 12*a* extending toward the floor of vehicle 3 while the driver enters or exits vehicle 3 in the present embodiment, the present disclosure is not limited to this example. In other words, in an effort to prevent grip 10 from obstructing the driver while entering or exiting vehicle 3, grip 10 can be rotated such that long portion 11*a* extends in a direction other than toward the ceiling of vehicle 3, for example, toward the front vehicle 3 or toward the front windshield, i.e., between a direction toward the front of vehicle and a direction toward the ceiling of vehicle 3. However, since entering or exiting vehicle 3 while holding grip 10 could become difficult in some cases with these configurations, it is preferable that long portion 11*a* extends toward the ceiling of vehicle 3 while the driver enters of exits vehicle 3.

In the pair of grips 10, when the steering position during driving is in the neutral position, a gap is formed between long portion 11*a* of one grip 10 and long portion 11*a* of the other grip 10. Accordingly, in configurations in which each grip 10 individually rotates, the pair of grips 10 can be configured to avoid interference with steering column 4 and column cover 6 (see FIG. 3B) that covers the bottom of steering column 4.

As illustrated in FIG. 1 and FIG. 2, the pair of second actuators 22 are provided corresponding to the pair of grips 10. Accordingly, the pair of second actuators 22 correspond to and rotate the pair of grips 10 one-to-one. The pair of second actuators 22 is configured as an actuating mechanism such as an electric motor.

Controller 30 is electrically connected to the pair of second actuators 22, and controls each of the pair of second actuators 22 individually.

More specifically, as illustrated in (a) in FIG. 1 and FIG. 2, controller 30 controls the pair of second actuators 22 such that, when vehicle 3 is being driven manually, either long portions 11*a* or short portions 12*a* of the pair of grips 10 extend toward the ceiling of vehicle 3. With this, when vehicle 3 is being driven manually, long portions 11*a* of the pair of grips 10 extend toward the ceiling of vehicle 3 and short portions 12*a* of the pair of grips 10 to extend toward the floor of vehicle 3. Alternatively, as illustrated in (a) in FIG. 1, short portions 12*a* of the pair of grips 10 extend toward the ceiling of vehicle 3 and long portions 11*a* of the pair of grips 10 extend toward the floor of vehicle 3.

As illustrated in (b) in FIG. 1 and FIG. 2, controller 30 controls the pair of second actuators 22 such that, when vehicle 3 is parked or autonomously driving, short portions 12*a* of the pair of grips 10 extend toward the rear of vehicle 3 and long portions 11*a* of the pair of grips 10 extend toward the front of vehicle 3. With this, when vehicle 3 is parked or autonomously driving, short portions 12*a* of the pair of grips 10 extend toward the rear of vehicle 3 and long portions 11*a* of the pair of grips 10 extend toward the front of vehicle 3.

As illustrated in (c) in FIG. 1 and FIG. 2, controller 30 controls second actuator 22 adjacent to door 9 of vehicle 3 adjacent to vehicle steering apparatus 1 such that while the driver is entering or exiting vehicle 3, long portion 11*a* of grip 10 adjacent to said door 9 of vehicle 3 extends toward the ceiling of vehicle 3, and short portion 12*a* of said grip 10 extends toward the floor of vehicle 3. With this, while the driver is entering or exiting vehicle 3, long portion 11*a* of grip 10 adjacent to door 9 extends toward the ceiling of vehicle 3 and short portion 12*a* of said grip 10 extends toward the floor of vehicle 3. Note in cases in which the driver has exited vehicle 3, controller 30 may maintain grip 10 adjacent door 9 in an orientation in which long portion 11*a* of said grip 10 is extending toward the ceiling of vehicle 3 and short portion 12*a* of said grip 10 is extending toward the floor of vehicle 3. In such cases, the driver can enter vehicle 3 while holding said grip 10.

Note that when sensor 31 detects an object placed on table 50 while the driver is entering or exiting vehicle 3, controller 30 controls second actuator 22 adjacent to door 9 of vehicle 3 adjacent to vehicle steering apparatus 1 such that long portion 11*a* of grip 10 adjacent to said door 9 of vehicle 3 extends toward the ceiling of vehicle 3 and short portion 12*a* of said grip 10 extends toward the floor of vehicle 3, without actuating first actuator 21. It goes without saying that grip 10 and table 50 are designed so as not to interfere with each other.

Operation Example 1

Next, an operation example of vehicle steering apparatus 1 will be described with reference to FIG. 4A and the like.

FIG. 4A is a flowchart illustrating Operation Example 1 of vehicle steering apparatus 1. In FIG. 4A, an example is illustrated where sensor 31 is implemented as a weight sensor. As illustrated in FIG. 4D (to be described later), first actuator 21 is controlled to move table 50 from steering column 4 toward the rear of vehicle 3 when parked, and while driving or when the driver is entering or exiting vehicle 3, first actuator 21 is controlled to move table 50 toward the front of vehicle 3 so as to store table 50 in storage space S in column cover 6.

First, sensor 31 detects an object placed on table 50 (S111). Sensor 31 outputs weight information indicating that an object is placed on table 50 to controller 30. Here, sensor 31 can detect the weight of an object placed on table 50, and it can output to controller 30 weight information including information indicating the weight of the object.

Next, upon obtaining the weight information, controller 30 determines whether the weight of the object indicated by the weight information is equal to or greater than a predetermined weight (S112).

Controller 30 determines that a heavy object is placed on the table if the weight of the object indicated by the weight information is equal to or greater than the predetermined weight (YES in S112).

When YES in step S112, without actuating first actuator 21, controller 30 outputs to alerter 70 an alert indicating that an object is placed on table 50 and an alert indicating that the object placed on table 50 is a heavy object (S113). As described above, the alert indicating that an object is placed on table 50 and the alert indicating that the object is a heavy object have different alert patterns.

In contrast, controller 30 determines that a heavy object is not placed on the table (an object less than the predetermined weight is placed on the table) if the weight of the object indicated by the weight information is less than the predetermined weight (NO in S112).

When NO in step S112, without actuating first actuator 21, controller 30 outputs to alerter 70 an alert indicating that an object is placed on table 50 (S114).

Next, after completing step S113 or step S114, controller 30 determines whether the object placed on table 50 has been removed after alerter 70 outputs an alert (S115).

Controller 30 controls actuation of first actuator 21 to move table 50 toward the front of vehicle 3 so as to store table 50 in column cover 6 when it has determined that the object placed on table 50 has been removed after alerter 70 outputs an alert (YES in S115). Controller 30 then ends the processing in the flowchart of FIG. 4A.

In contrast, when controller 30 determines that the object placed on table 50 has not been removed after alerter 70 outputs an alert, that is, when sensor 31 detects the object placed on table 50 (NO in S115), controller 30 does not actuate first actuator 21 (S116). For example, controller 30 may cause alerter 70 to output an alert indicating that a heavy object is placed on table 50 when sensor 31 detects an object is still placed on table 50 after a predetermined period has elapsed since alerter 70 output the alert. Controller 30 then ends the processing in the flowchart of FIG. 4A.

Note that in step S112 of this operation example, it was determined whether the weight of the object is greater than or equal to a predetermined weight, but this process may be omitted, and step S113 may also be omitted. Stated differently, steps S112 and S113 in FIG. 4A are not mandatory processes.

Operation Example 2

Next, an operation example of vehicle steering apparatus 1 will be described with reference to FIG. 4B and the like.

FIG. 4B is a flowchart illustrating Operation Example 2 of vehicle steering apparatus 1. In FIG. 4B, an example is illustrated where sensor 31 is implemented as a weight sensor.

First, when the driver operates switch 25, switch 25 outputs an instruction to controller 30 (S121).

Next, when a storage instruction is output from switch 25, controller 30 controls actuation of first actuator 21 to move table 50 toward the front of vehicle 3 so as to store table 50 in column cover 6 (S122). Controller 30 then ends the processing in the flowchart of FIG. 4B.

However, when a deploy instruction is output from switch 25, controller 30 controls actuation of first actuator 21 to move table 50 from steering column 4 toward the rear of vehicle 3 so as to deploy table 50 from column cover 6 (S123). Controller 30 then ends the processing in the flowchart of FIG. 4B.

Operation Example 3

Next, an operation example of vehicle steering apparatus 1 will be described with reference to FIG. 4C and the like.

FIG. 4C is a flowchart illustrating Operation Example 3 of vehicle steering apparatus 1.

First, when controller 30 controls actuation of first actuator 21 to deploy table 50 from column cover 6, controller 30 determines whether contact sensor 32 has detected contact between an object and table 50 (S131).

Next, when controller 30 determines that contact sensor 32 has not detected contact between an object and table 50 (NO in S131), it returns to step S131.

However, when contact sensor 32 detects contact with an object on table 50 (YES in S131), controller 30 stops actuating first actuator 21, or controls actuation of first actuator 21 to move table 50 toward the front of vehicle 3 so as to store table 50 in column cover 6 (S132). For example, when controller 30 stops actuation of first actuator 21, table 50 remains in a deployed state up to the position where first actuator 21 has stopped. When controller 30 controls actuation of first actuator 21 to move table 50 toward the front of vehicle 3 so as to store table 50 in column cover 6, table 50 is stored in column cover 6. Controller 30 then ends the processing in the flowchart of FIG. 4C.

Operation Example 4

Next, an operation example of vehicle steering apparatus 1 will be described with reference to FIG. 4D and the like.

FIG. 4D is a flowchart illustrating vehicle steering apparatus 1 including a pair of automatically rotatable grips 10.

First, controller 30 determines whether vehicle 3 is driving or not (S11). Whether vehicle 3 is driving or not may be determined by determining whether controller 30 has obtained from, for example, an electronic control unit (ECU), information indicating that the ignition switch is on and the gear lever is in drive (D).

As illustrated in (a) in FIG. 1, FIG. 2, and FIG. 4D, when controller 30 determines that vehicle 3 is driving (Yes in S11), controller 30 controls the pair of second actuators 22 so as to orient the pair of grips 10 such that long portions 11*a* or short portions 12*a* are extending toward the ceiling of vehicle 3 and short portions 12*a* or long portions 11*a* are extending toward the floor of vehicle 3 (S14). With this, the pair of grips 10 rotate, resulting in either long portions 11*a* or short portions 12*a* extending toward the ceiling of vehicle 3 and short portions 12*a* or long portions 11*a* extending toward the floor of vehicle 3. Controller 30 proceeds to step S18.

However, when controller 30 determines that vehicle 3 is not driving (No in S11), controller 30 determines whether vehicle 3 is parked or not (S12). Whether vehicle 3 is parked or not may be determined by determining whether controller 30 has obtained from, for example, an ECU, information indicating that the ignition switch is on and the gear lever is in park (P), or indicating that the ignition switch is off and door 9 is closed.

When controller 30 determines that vehicle 3 is parked (Yes in S12), as illustrated in (b) in FIG. 1, FIG. 2, and FIG. 4D, controller 30 controls the pair of second actuators 22 so as to orient the pair of grips 10 such that long portions 11*a* are extending toward the front of vehicle 3 and short portions 12*a* are extending toward the rear of vehicle 3 (S15). With this, the pair of grips 10 rotate, resulting in long portions 11*a* extending toward the front of vehicle 3 and short portions 12*a* extending toward the rear of vehicle 3.

Note that in step S12, controller 30 determines whether vehicle 3 is parked or not, but this example is non-limiting. For example, controller 30 may be configured to determine whether vehicle 3 is autonomously driving or not.

Next, controller 30 determines whether the switch for table 50 is on or not (S16).

When controller 30 determines that the switch for table 50 is off (No in S16), controller 30 returns to step S11.

When controller 30 determines that the switch for table 50 is on (Yes in S16), as illustrated in (d) in FIG. 1, FIG. 2, FIG. 3A and FIG. 4D, controller 30 controls first actuator 21 to move table 50 toward the rear of vehicle 3 (S17). With this, table 50 moves from storage space S in column cover 6 toward the rear of vehicle 3 so as to be deployed to a position directly in front of the driver's seat. Controller 30 then returns to step S11.

In step S12 described above, when controller 30 determines that vehicle 3 is not parked (No in S12), since this implies the driver is not in the process of entering or exiting vehicle 3, as illustrated in (c) in FIG. 1, FIG. 2, and FIG. 4D, controller 30 controls the pair of second actuators 22 so as to orient grip 10 adjacent to door 9 of vehicle 2 adjacent to vehicle steering apparatus 1 such that long portion 11*a* is extending toward the ceiling of vehicle 3 (S13). With this, grip 10 adjacent to door 9 rotates, resulting in long portion 11*a* extending toward the ceiling of vehicle 3 and short portion 12*a* extending toward the floor of vehicle 3. Whether the driver is entering or exiting vehicle 3 or not may be determined by determining whether controller 30 has obtained from, for example, an ECU, information indicating that the ignition switch is off and door 9 is open.

Next, controller 30 determines whether table 50 is stored in storage space S in column cover 6 or not (S18).

When controller 30 determines that table 50 is stored in storage space S in column cover 6 (Yes in S18), controller 30 returns to step S11.

However, when controller 30 determines that table 50 is not stored in column cover 6 (No in S18), controller 30 controls first actuator 21 to store table 50 in storage space S (S19). With this, table 50 moves toward the front of vehicle 3, and is stored in storage space S in column cover 6. Controller 30 then returns to step S11.

Configuration and Function in Manual Mode

Hereinbefore, an example was given in which the pair of grips 10 are automatically rotatable. Next, an example in which the pair of grips 10 are manually rotatable relative to spoke 2 will be given with reference to FIG. 5.

Figure 5:
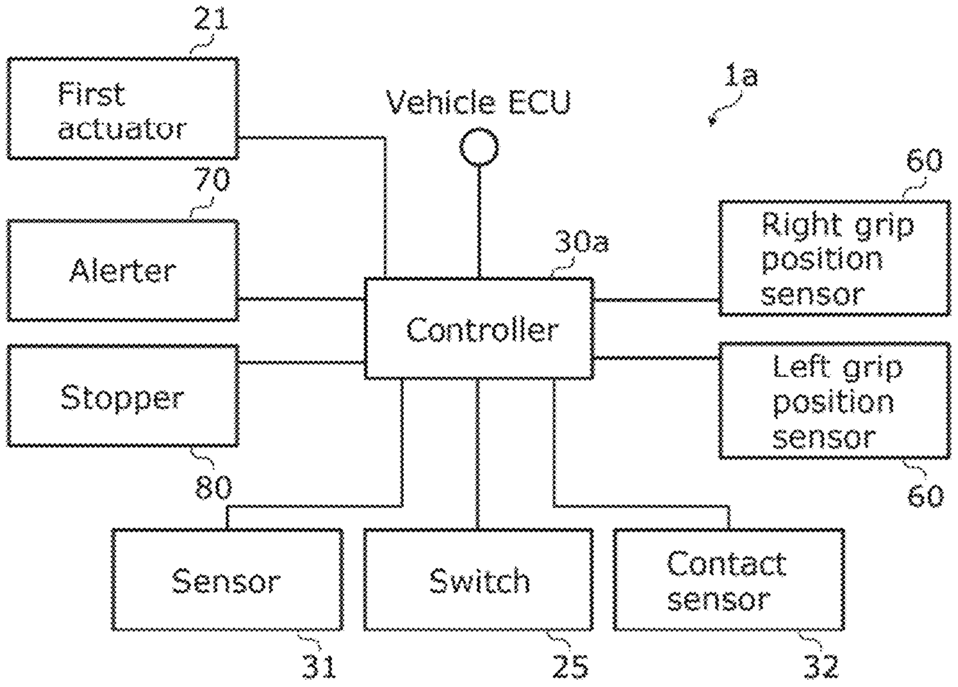
FIG. 5 is a block diagram illustrating a vehicle steering apparatus including a pair of manually rotatable grips.

FIG. 5 is a block diagram illustrating vehicle steering apparatus 1*a* including a pair of manually rotatable grips 10.

In such cases, vehicle steering apparatus 1*a* may further include a pair of position sensors 60 and stopper 80 in addition to table 50, controller 30*a*, first actuator 21, sensor 31, alerter 70, switch 25, contact sensor 32, spoke 2, and a pair of grips 10. Moreover, vehicle steering apparatus 1*a* need not include the pair of second actuators 22.

The pair of position sensors 60 are provided in one-to-one correspondence with the pair of grips 10. The pair of position sensors 60 respectively detect the rotational positions of the pair of grips 10. Each position sensor 60 outputs the rotational position of the corresponding grip 10 to controller 30*a*. The rotational position is indicated by, for example, the attitude (position) of grip 10 relative to spoke 2, and/or the angle or rotation of grip 10.

Controller 30*a* is electrically connected to the pair of position sensors 60, and obtains the rotational positions of the pair of grips 10 from the pair of position sensors 60.

More specifically, when controller 30*a* determines that long portions 11*a* or short portions 12*a* of the pair of grips 10 are oriented extending toward the ceiling of vehicle 3 based on the rotational positions of the pair of grips 10 detected by the pair of position sensors 60, controller 30*a* outputs a ready-to-drive signal. In other words, since long portions 11*a* of the pair of grips 10 are extending toward the ceiling or floor of vehicle 3 and short portions 12*a* of the pair of grips 10 are extending toward the floor or ceiling of vehicle 3, the pair of grips 10 are in an orientation in which the driver can hold the pair of grips 10 and drive vehicle 3. In this case, controller 30*a* outputs a ready-to-drive signal.

When controller 30*a* determines that short portions 12*a* of the pair of grips 10 are oriented extending toward the rear of vehicle 3 and long portions 11*a* of the pair of grips 10 are oriented extending toward the front of vehicle 3 based on the rotational positions of the pair of grips 10 detected by the pair of position sensors 60, controller 30*a* outputs a parked signal. In other words, when the steering position during driving is the neutral position, since the pair of grips 10 are oriented laid flat parallel to the horizontal direction, the driver does not drive vehicle 3. In this case, controller 30*a* outputs a parked signal.

When controller 30*a* determines that long portion 11*a* of grip 10 adjacent to door 9 of vehicle 3 adjacent to vehicle steering apparatus 1*a* is extending toward the ceiling of vehicle 3 and short portion 12*a* of said grip 10 is extending toward the floor of vehicle 3 based on the rotational positions of the pair of grips 10 detected by the pair of position sensors 60, controller 30*a* outputs a door unlock authorization signal. In other words, when the driver wishes to unlock door 9 of vehicle 3 adjacent to vehicle steering apparatus 1*a*, the driver manually adjusts the orientation of grip 10 adjacent to door 9 such that long portion 11*a* of said grip 10 extends toward the ceiling of vehicle 3 and short portion 12*a* of said grip 10 extends toward the floor of vehicle 3. This causes controller 30*a* to output a door unlock authorization signal, whereby the driver can exit vehicle 3. Moreover, in cases in which the driver is entering vehicle 3, the driver may sit in the driver's seat while holding long portion 11*a* of grip 10 adjacent to door 9. This makes it easier for the driver to enter and exit vehicle 3.

Stopper 80 is electrically connected to controller 30*a* and restricts movement of table 50. Stopper 80 is, for example, a solenoid stopper including an electromagnetic actuator or the like.

Stopper 80 can, under control by controller 30*a*, restrict movement of table 50 and unrestrict movement of table 50. When stopper 80 is unlocked, it outputs a signal indicating that it is unlocked to controller 30*a*. When stopper 80 is locked, it outputs a signal indicating that it is locked to controller 30*a*.

When controller 30*a* has output the parked signal, controller 30*a* unlocks stopper 80 that restricts movement of table 50 toward the rear of vehicle 3. In other words, the driver may want to deploy table 50 stored in storage space S in column cover 6 while vehicle 3 is parked, so controller 30*a* actuates and unlocks stopper 80.

Upon outputting a ready-to-drive signal or a door unlock authorization signal, if stopper 80 is unlocked, controller 30*a* causes alerter 70 to output an alert prompting storage of table 50.

Operation Example 5

Next, an operation example of vehicle steering apparatus 1*a* will be described with reference to FIG. 6 and the like.

Figure 6:
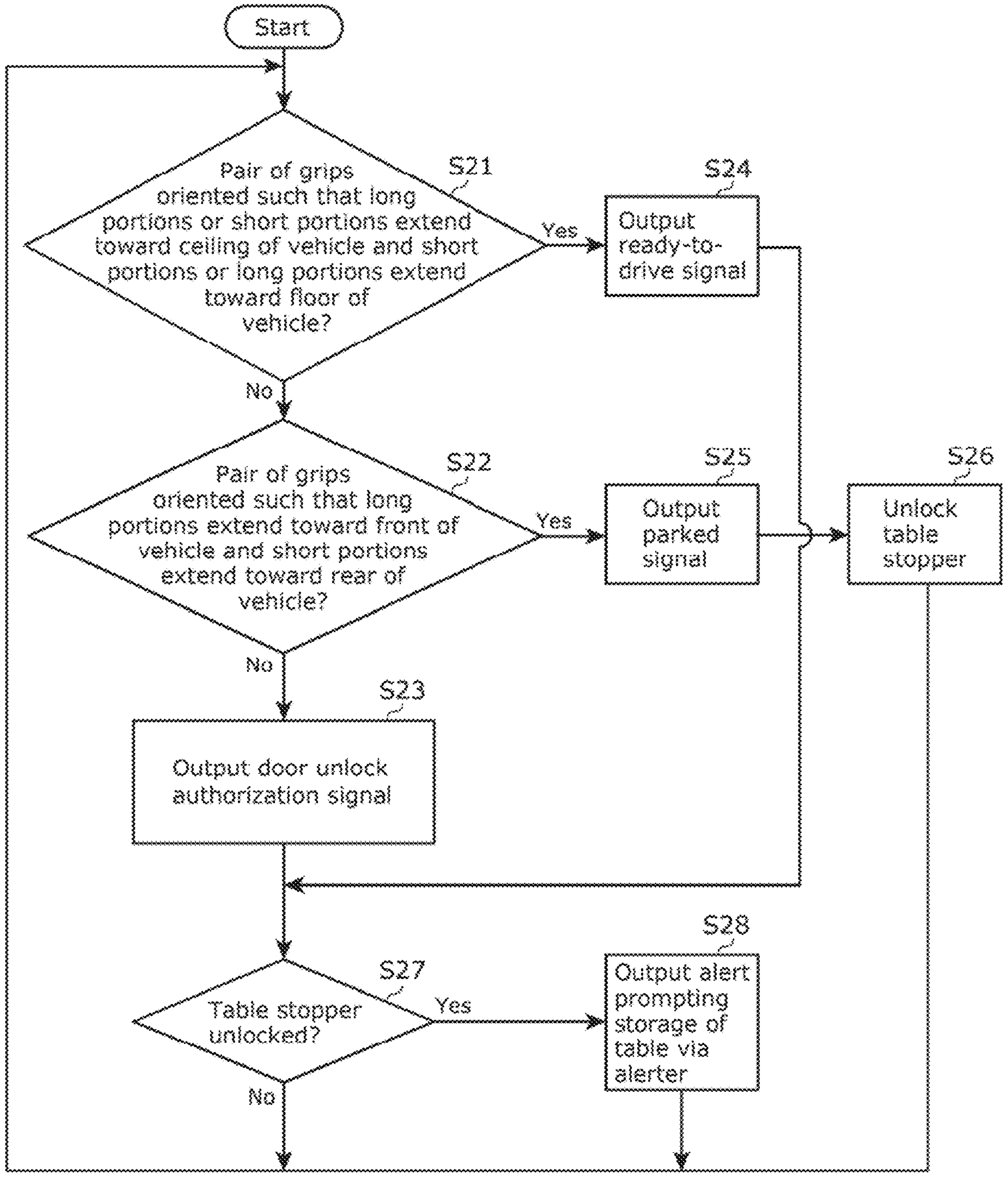
FIG. 6 is a flowchart illustrating a vehicle steering apparatus including a pair of manually rotatable grips.

FIG. 6 is a flowchart illustrating vehicle steering apparatus 1*a* including a pair of manually rotatable grips 10.

As illustrated in FIG. 5 and FIG. 6, controller 30*a* determines whether the pair of grips 10 are oriented such that long portions 11*a* or short portions 12*a* are extending toward the ceiling of vehicle 3 and short portions 12*a* or long portions 11*a* are extending toward the floor of vehicle 3 based on the rotational positions of the pair of grips 10 detected by the pair of position sensors 60 (S21).

When controller 30*a* determines that the pair of grips 10 are oriented such that long portions 11*a* or short portions 12*a* are extending toward the ceiling of vehicle 3 and short portions 12*a* or long portions 11*a* are extending toward the floor of vehicle 3 (Yes in S21), controller 30*a* outputs a ready-to-drive signal to the ECU (S24). With this, vehicle 3 is drivable. Controller 30*a* proceeds to step S27.

However, when controller 30*a* determines that the pair of grips 10 are not oriented such that long portions 11*a* or short portions 12*a* are not extending toward the ceiling of vehicle 3 (No in S21), controller 30*a* determines whether the pair of grips 10 are oriented such that long portions 11*a* are extending toward the front of vehicle 3 and short portions 12*a* are extending toward the front of vehicle 3 (S22).

When controller 30*a* determines that the pair of grips 10 are oriented such that long portions 11*a* are extending toward the front of vehicle 3 and short portions 12*a* are extending toward the rear of vehicle 3 (Yes in S22), controller 30*a* outputs a parked signal (S25).

Next, when controller 30*a* has output the parked signal, controller 30*a* controls stopper 80 that restricts movement of table 50 toward the rear of vehicle 3 so as to unlock stopper 80 (S26). Controller 30*a* then returns to step S21.

In step S22 described above, when controller 30*a* determines that the pair of grips 10 are not oriented such that long portions 11*a* are extending toward the front of vehicle 3 and short portions 12*a* are extending toward the rear of vehicle 3 (No in S22), as this state is neither (a) nor (b) in FIG. 1, controller 30*a* determines it to be state (c) in FIG. 1, and outputs a door unlock authorization signal to the ECU (S23).

Next, controller 30*a* determines whether stopper 80 is unlocked or not (S27).

When controller 30*a* determines that stopper 80 is not unlocked (No in S27), it returns to step S21. Therefore, since stopper 80 not being unlocked indicates table 50 is stored in storage space S within column cover 6, the pair of grips 10 are capable of being oriented such that long portions 11*a* or short portions 12*a* extend toward the ceiling of vehicle 3 and short portions 12*a* or long portions 11*a* extend toward the floor of vehicle 3.

When controller 30*a* determines that stopper 80 is unlocked (Yes in S27), controller 30*a* causes alerter 70 to output an alert prompting storage of table 50 (S28). Controller 30*a* then returns to step S21.

Although the present embodiment presents an example in which vehicle steering apparatus 1*a* includes table 50, vehicle steering apparatus 1*a* is not required to include table 50.

Embodiment Variations

Next, vehicle steering apparatus 1*b* according to the present variation will be described with reference to FIG. 7 and FIG. 8.

Figure 7:
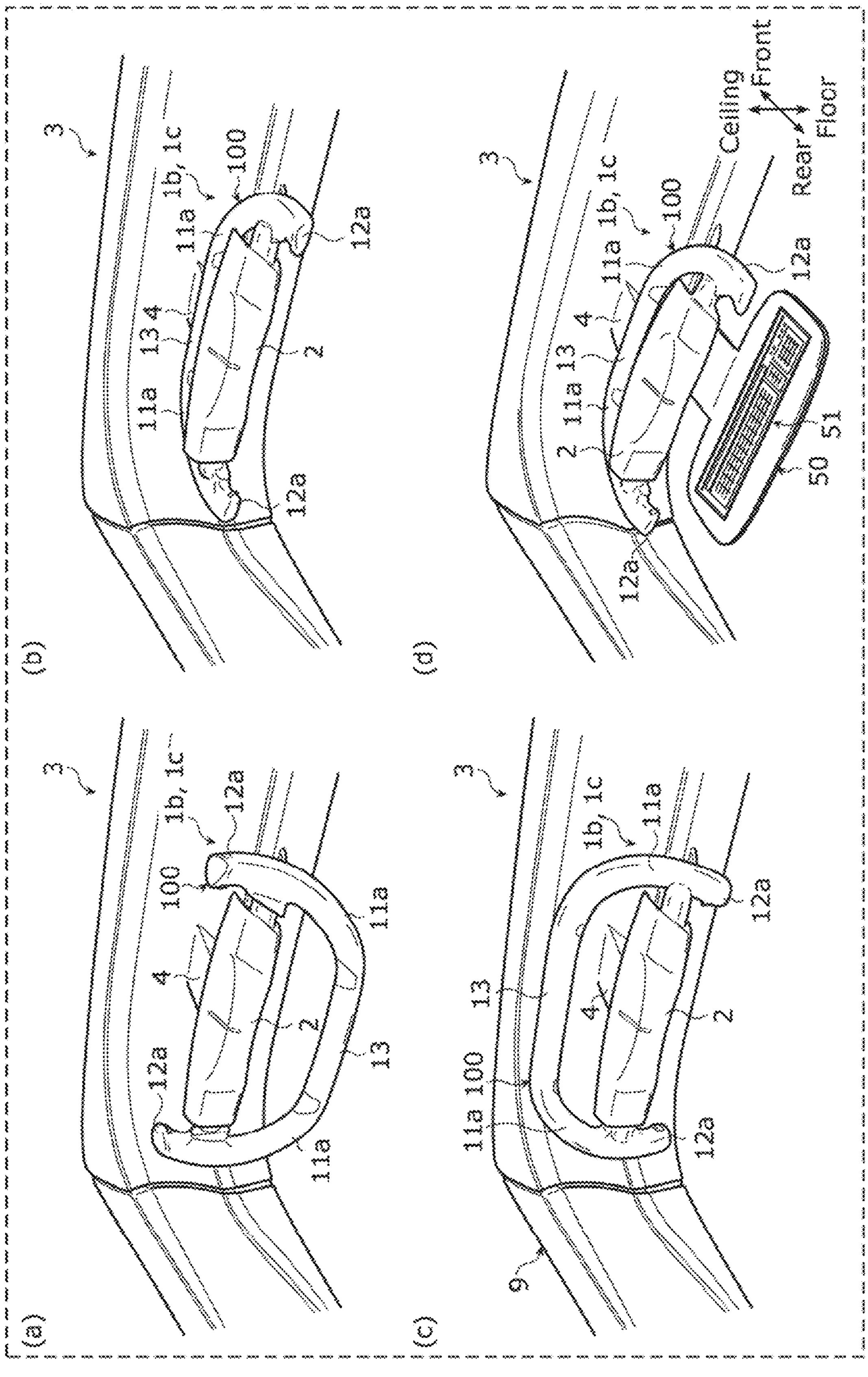
FIG. 7 is a perspective view illustrating a vehicle steering apparatus including an automatically rotatable steering wheel.

FIG. 7 is a perspective view illustrating vehicle steering apparatus 1*b* including an automatically rotatable steering wheel 100. In FIG. 7, (a) illustrates vehicle steering apparatus 1*b* when the steering position during driving is in the neutral position. In FIG. 7, (b) illustrates vehicle steering apparatus 1*b* with steering wheel 100 laid flat horizontally. In FIG. 7, (c) illustrates vehicle steering apparatus 1*b* with steering wheel 100 oriented vertically such that connecting portion 13 is positioned above spoke 2. In FIG. 7, (d) illustrates vehicle steering apparatus 1*b* with steering wheel 100 laid flat horizontally and table 50 deployed. FIG. 8 is a block diagram illustrating vehicle steering apparatus 1*b* including the automatically rotatable steering wheel 100.

The pair of grips 10 according to the present variation differ from the pair of grips 10 according to the embodiment in that corresponding ends of the pair of grips 10 are integrally connected. The configuration of vehicle steering apparatus 1*b* according to the present variation is similar to that described in the embodiment, so the same reference signs are used for vehicle steering apparatus 1*b* according to the present variation, and descriptions are omitted as appropriate.

Configuration and Function in Automatic Mode

In the present variation, one end (long portion 11*a*) of one grip in the pair of grips and one end (long portion 11*a*) of the other grip in the pair of grips are connected together via connecting portion 13, forming semicircular grips. In the present variation, the pair of grips connected by connecting portion 13 (the semicircular grips) is referred to as steering wheel 100.

Figure 8:
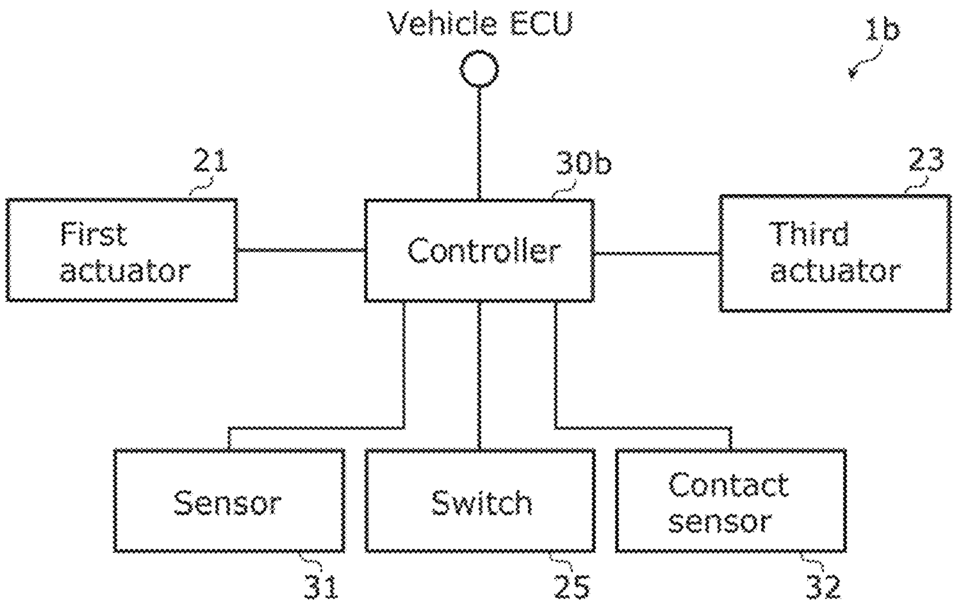
FIG. 8 is a block diagram illustrating a vehicle steering apparatus including an automatically rotatable steering wheel.

As illustrated in FIG. 7 and FIG. 8, vehicle steering apparatus 1*b* according to the present variation includes spoke 2, steering wheel 100, third actuator 23, and controller 30*b*.

The left end portion of steering wheel 100 is connected to the left end portion of spoke 2, and the right end portion of steering wheel 100 is connected to the right end portion of spoke 2.

Steering wheel 100 is rotatable relative to spoke 2. Steering wheel 100 is automatically rotatable relative to spoke 2 via third actuator 23 under control by controller 30*b*. Steering wheel 100 rotates as a single unit relative to spoke 2 since the pair of grips 10 are integrated via connecting portion 13.

Steering wheel 100 includes connecting portion 13, which corresponds to the above-described long portion 11*a*, and short portions 12*a*.

As illustrated in (a) in FIG. 7, steering wheel 100 is capable of rotating such that, while driving, short portions 12*a* are positioned toward the ceiling of vehicle 3 relative to spoke 2 and connecting portion 13 is positioned toward the floor of vehicle 3 relative to spoke 2. Stated differently, since steering wheel 100 is rotatable relative to spoke 2, it is possible for steering wheel 100 to assume an orientation in which connecting portion 13 is positioned toward the floor of vehicle 3 relative to spoke 2 and short portions 12*a* extend toward the ceiling of vehicle 3 relative to spoke 2. Note that steering wheel 100 may be capable of rotating such that, while driving, short portions 12*a* are positioned toward the floor of vehicle 3 relative to spoke 2 and connecting portion 13 is positioned toward the ceiling of vehicle 3 relative to spoke 2.

Since steering wheel 100 is rotatable relative to spoke 2, steering wheel 100 can rotate such that, while parked, short portions 12*a* are positioned toward the rear of vehicle 3 relative to spoke 2 and long portions 11*a* are positioned toward the front of vehicle 3 relative to spoke 2, as illustrated in (b) in FIG. 7. Stated differently, since steering wheel 100 is rotatable relative to spoke 2, it is possible for steering wheel 100 to assume an orientation in which short portions 12*a* are positioned toward the rear of vehicle 3 relative to spoke 2 and connecting portion 13 is positioned toward the front of vehicle 3 relative to spoke 2.

As illustrated in (c) in FIG. 7, while the driver enters or exits vehicle 3, steering wheel 100 can be oriented such that connecting portion 13 is positioned toward the ceiling of vehicle 3 relative to spoke 2 and short portions 12*a* extend toward the floor of vehicle 3 relative to spoke 2 so as to allow the driver to enter or exit vehicle 3 while holding steering wheel 100.

Although connecting portion 13 is exemplified as being positioned toward the ceiling of vehicle 3 relative to spoke 2 and short portions 12*a* extending toward the floor of vehicle 3 while the driver enters or exits vehicle 3 in the present variation, the present disclosure is not limited to this example. In other words, in an effort to prevent steering wheel 100 from obstructing the driver while entering or exiting vehicle 3, steering wheel 100 can be rotated such that connecting portion 13 is positioned in a direction other than toward the ceiling of vehicle 3 relative to spoke 2, for example, toward the front of vehicle 3 or toward the front windshield, i.e., between a direction toward the front of vehicle and a direction toward the ceiling of vehicle 3. However, since entering or exiting vehicle 3 while holding steering wheel 100 could become difficult in some cases with these configurations, it is preferable that connecting portion 13 is positioned toward the ceiling of vehicle 3 relative to spoke 2 while the driver enters of exits vehicle 3.

Third actuator 23 actuates to rotate steering wheel 100. Third actuator 23 is configured as an actuating mechanism such as an electric motor.

Controller 30*b* is electrically connected to third actuator 23, and controls third actuator 23.

More specifically, as illustrated in (a) and (c) in FIG. 7 and FIG. 8, controller 30*b* controls third actuator 23 such that, while vehicle 3 is driving, either connecting portion 13 or short portions 12*a* of steering wheel 100 are positioned toward the ceiling of vehicle 3 relative to spoke 2. Accordingly, as illustrated in (c) in FIG. 7, while vehicle 3 is driving, connecting portion 13 of steering wheel 100 is positioned toward the ceiling of vehicle 3 relative to spoke 2 and short portions 12*a* of steering wheel 100 extend toward the floor of vehicle 3. Alternatively, as illustrated in (a) in FIG. 7, short portions 12*a* of steering wheel 100 extend toward the ceiling of vehicle 3 and connecting portion 13 of steering wheel 100 is positioned toward the floor of vehicle 3 relative to spoke 2.

As illustrated in (b) in FIG. 7 and FIG. 8, controller 30*b* controls third actuator 23 such that, when vehicle 3 is parked or autonomously driving, short portions 12*a* of steering wheel 100 extend toward the rear of vehicle 3 and connecting portion 13 of steering wheel 100 is positioned toward the front of vehicle 3 relative to spoke 2. With this, when vehicle 3 is parked, short portions 12*a* of steering wheel 100 extend toward the rear of vehicle 3 and connecting portion 13 of steering wheel 100 is positioned toward the front of vehicle 3 relative to spoke 2.

As illustrated in (c) in FIG. 7 and FIG. 8, controller 30*b* controls third actuator 23 such that while the driver is entering or exiting vehicle 3, connecting portion 13 of steering wheel 100 is positioned toward the ceiling of vehicle 3 relative to spoke 2, and short portions 12*a* of steering wheel 100 extend toward the floor of vehicle 3. With this, while the driver is entering or exiting vehicle 3, connecting portion 13 of steering wheel 100 is positioned toward the ceiling of vehicle 3 relative to spoke 2 and short portions 12*a* of steering wheel 100 extend toward the floor of vehicle 3.

Note that when connecting portion 13 of steering wheel 100 is positioned toward the ceiling of vehicle 3 during driving, controller 30*b* controls third actuator 23 to differentiate the position of connecting portion 13 during driving from the position of connecting portion 13 while the driver is entering or exiting vehicle 3 so as to be distinguishable to the driver. In other words, controller 30*b* controls third actuator 23 so as to position connecting portion 13 toward the ceiling relative to spoke 2, tilted slightly toward the front windshield during driving, and controls third actuator 23 so as to position connecting portion 13 toward the ceiling relative to spoke 2, tilted slightly toward the seat while the driver enters or exits vehicle 3.

Just like in the above embodiment, vehicle steering apparatus 1*b* may further include table 50, first actuator 21, sensor 31, alerter 70, switch 25, and contact sensor 32 in addition to spoke 2, steering wheel 100, third actuator 23, and controller 30*b*.

As illustrated in (d) in FIG. 7, table 50 is disposed below vehicle steering apparatus 1*b* and is capable of moving in the front and rear directions of vehicle 3. Table 50 is storable in storage space S in column cover 6 (see FIG. 3A and FIG. 3B) that covers the bottom of steering column 4. Table 50 deploys from storage space S in column cover 6 so as to move closer to the driver's seat.

Table 50 further includes input interface 51. Input interface 51 is a touch pad, a touch panel, or a projection keyboard.

First actuator 21 actuates table 50 so as to move table 50 in the front and rear directions of vehicle 3. More specifically, when first actuator 21 actuates table 50 so as to move table 50 from steering column 4 towards the rear of vehicle 3, it protrudes table 50 from column cover 6 and positions table 50 directly in front of the driver's seat. First actuator 21 actuates table 50 so as to move table 50 toward the front of vehicle 3 and store table 50 in storage space S in column cover 6.

Controller 30*b* controls first actuator 21 to move table 50 from steering column 4 toward the rear of vehicle 3 when parked. While driving or when the driver is entering or exiting vehicle 3, controller 30*b* controls first actuator 21 to move table 50 toward the front of vehicle 3 so as to store table 50 in storage space S in column cover 6.

Operation Example 6

Next, an operation example of vehicle steering apparatus 1*b* will be described with reference to FIG. 9.

Figure 9:
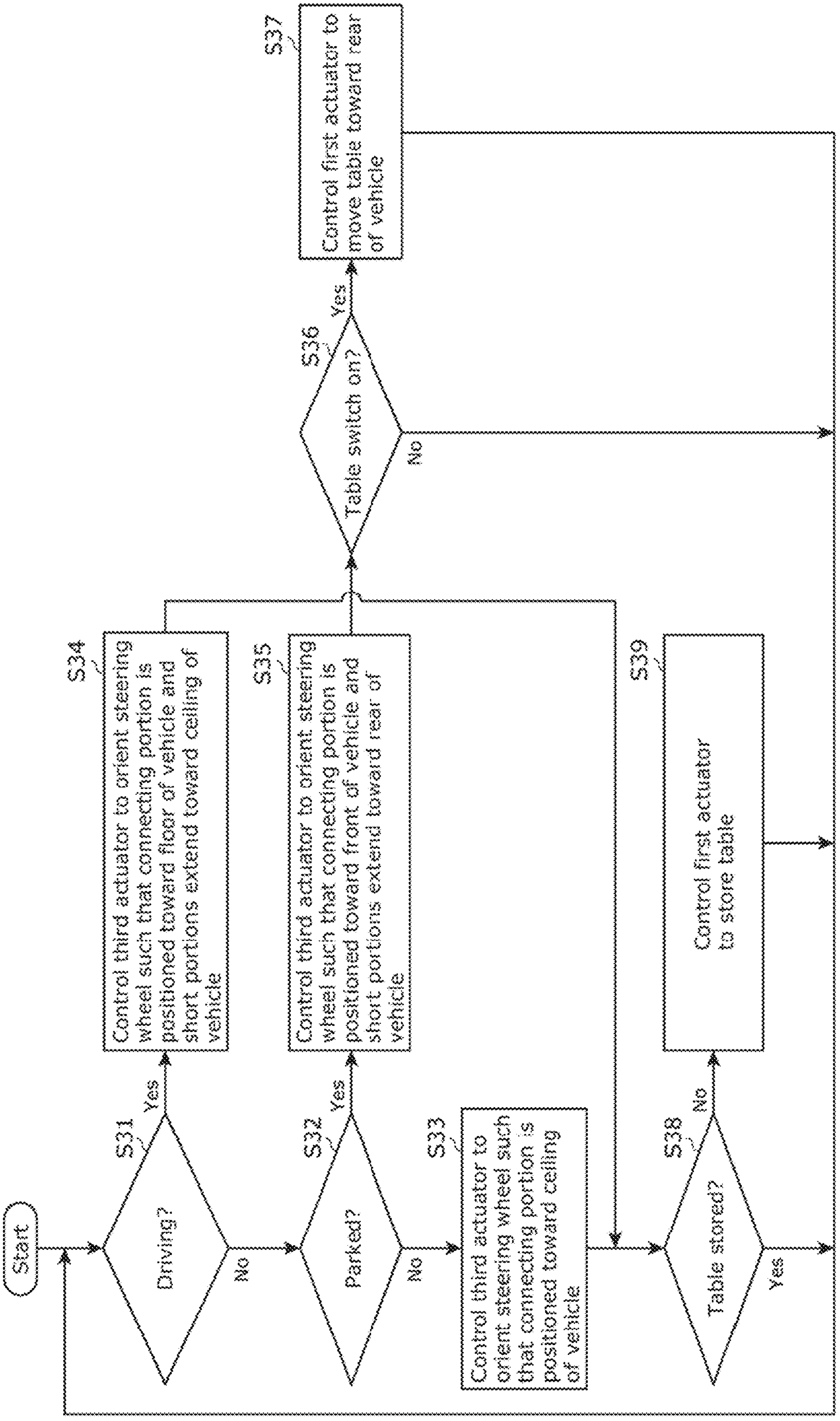
FIG. 9 is a flowchart illustrating a vehicle steering apparatus including an automatically rotatable steering wheel.

FIG. 9 is a flowchart illustrating vehicle steering apparatus 1*b* including the automatically rotatable steering wheel 100. The following description pertains to a case where, while driving, connecting portion 13 of steering wheel 100 is positioned toward the floor of vehicle 3 relative to spoke 2.

First, controller 30*b* determines whether vehicle 3 is driving or not (S31).

When controller 30*b* determines that vehicle 3 is driving (Yes in S31), controller 30*b* controls third actuator 23 such that connecting portion 13 of steering wheel 100 is positioned toward the floor of vehicle 3 relative to spoke 2, and short portions 12*a* extend toward the ceiling of vehicle 3 (S34). With this, steering wheel 100 rotates, resulting in connecting portion 13 being positioned toward the floor of vehicle 3 relative to spoke 2 and short portions 12*a* extending toward the ceiling of vehicle 3. Controller 30*b* proceeds to step S38.

However, when controller 30*b* determines that vehicle 3 is not driving (No in S31), controller 30*b* determines whether vehicle 3 is parked or not (S32).

When controller 30*b* determines that vehicle 3 is parked (Yes in S32), as illustrated in (b) in FIG. 7, FIG. 8, and FIG. 9, controller 30*b* controls third actuator 23 such that connecting portion 13 of steering wheel 100 is positioned toward the front of vehicle 3 relative to spoke 2, and short portions 12*a* extend toward the rear of vehicle 3 (S35). With this, steering wheel 100 rotates, resulting in connecting portion 13 being positioned toward the front of vehicle 3 relative to spoke 2 and short portions 12*a* extending toward the rear of vehicle 3.

Note that in step S32, controller 30*b* determines whether vehicle 3 is parked or not, but this example is non-limiting. For example, controller 30*b* may be configured to determine whether vehicle 3 is autonomously driving or not.

Next, controller 30*b* determines whether the switch for table 50 is on or not (S36).

When controller 30*b* determines that the switch for table 50 is off (No in S36), controller 30*b* returns to step S31.

When controller 30*b* determines that the switch for table 50 is on (Yes in S36), as illustrated in (d) in FIG. 7, FIG. 8, and FIG. 9, controller 30*b* controls first actuator 21 to move table 50 toward the rear of vehicle 3 (S37). With this, table 50 moves from column cover 6 toward the rear of vehicle 3 so as to be deployed to a position directly in front of the driver's seat. Controller 30*b* then returns to step S31.

In step S32 described above, when controller 30*b* determines that vehicle 3 is not parked (No in S32), since this implies the driver is in the process of entering or exiting vehicle 3, as illustrated in (c) in FIG. 7, FIG. 8, and FIG. 9, controller 30*b* controls third actuator 23 such that connecting portion 13 of steering wheel 100 is positioned toward the ceiling of vehicle 3 relative to spoke 2 (S33). With this, steering wheel 100 rotates, resulting in connecting portion 13 being positioned toward the ceiling of vehicle 3 relative to spoke 2 and short portions 12*a* extending toward the floor of vehicle 3.

Next, controller 30*b* determines whether table 50 is stored in storage space S in column cover 6 or not (S38).

When controller 30*b* determines that table 50 is stored in storage space S in column cover 6 (Yes in S38), controller 30*b* returns to step S31.

However, when controller 30*b* determines that table 50 is not stored in storage space S in column cover 6 (No in S38), controller 30*b* controls first actuator 21 to store table 50 (S39). With this, table 50 moves toward the front of vehicle 3, and is stored in storage space S in column cover 6. Controller 30*b* then returns to step S31.

Configuration and Function in Manual Mode

Hereinbefore, an example was given in which steering wheel 100 is automatically rotatable. Next, an example in which steering wheel 100 is manually rotatable relative to spoke 2 will be given with reference to FIG. 10.

Figure 10:
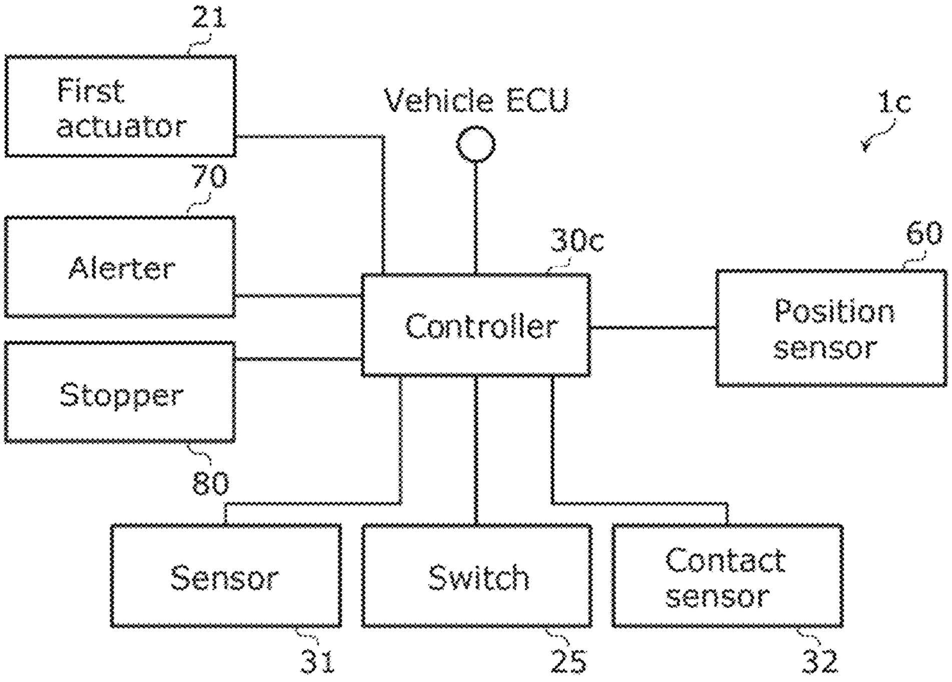
FIG. 10 is a block diagram illustrating a vehicle steering apparatus including a manually rotatable steering wheel.

FIG. 10 is a block diagram illustrating vehicle steering apparatus 1*c* including the manually rotatable steering wheel 100.

In such cases, vehicle steering apparatus 1*c* may further include position sensor 60 and stopper 80 in addition to spoke 2, steering wheel 100, controller 30*c*, first actuator 21, table 50, sensor 31, alerter 70, switch 25, and contact sensor 32. Moreover, vehicle steering apparatus 1*c* need not include third actuator 23.

Position sensor 60 detects the rotational positions of steering wheel 100. Position sensor 60 outputs the rotational positions of steering wheel 100 to controller 30*c*.

Controller 30*c* is electrically connected to position sensor 60 and obtains rotational positions of steering wheel 100.

More specifically, when controller 30*c* determines that either connecting portion 13 or short portions 12*a* of steering wheel 100 is positioned toward the ceiling of vehicle 3 relative to spoke 2 based on the rotational positions of steering wheel 100 detected by position sensor 60, controller 30*c* outputs a ready-to-drive signal. In other words, since connecting portion 13 of steering wheel 100 is positioned toward the ceiling or floor of vehicle 3 relative to spoke 2 and short portions 12*a* of steering wheel 100 are extending toward the floor or ceiling of vehicle 3, steering wheel 100 is in an orientation in which the driver can hold steering wheel 100 and drive vehicle 3. In this case, controller 30*c* outputs a ready-to-drive signal.

When controller 30*c* determines that short portions 12*a* of steering wheel 100 are oriented extending toward the rear of vehicle 3 and connecting portion 13 of steering wheel 100 is positioned toward the front of vehicle 3 relative to spoke 2 based on the rotational positions of steering wheel 100 detected by position sensor 60, controller 30*c* outputs a parked signal. In other words, when the steering position during driving is the neutral position, since steering wheel 100 is oriented laid flat parallel to the horizontal direction, the driver does not drive vehicle 3. In this case, controller 30*c* outputs a parked signal.

When controller 30*c* determines that connecting portion 13 of steering wheel 100 is positioned toward the ceiling of vehicle 3 relative to spoke 2 and short portions 12*a* of steering wheel 100 extend toward the floor of vehicle 3 based on the rotational positions of steering wheel 100 detected by position sensor 60, controller 30*c* outputs a door unlock authorization signal. In other words, when the driver wishes to unlock door 9 of vehicle 3 adjacent to vehicle steering apparatus 1*c*, the driver manually adjusts the orientation of steering wheel 100 such that connecting portion 13 is positioned toward the ceiling of vehicle 3 relative to spoke 2 and short portions 12*a* of steering wheel 100 extend toward the floor of vehicle 3. This causes controller 30*c* to output a door unlock authorization signal, whereby the driver can exit vehicle 3. Moreover, in cases in which the driver is entering vehicle 3, the driver may sit in the driver's seat while holding long portion 11*a* of steering wheel 100. This makes it easier for the driver to enter and exit vehicle 3.

Note that when connecting portion 13 of steering wheel 100 is positioned toward the ceiling of vehicle 3 during driving, in order to differentiate between connecting portion 13 of steering wheel 100 being positioned toward the ceiling of vehicle 3 while the driver is entering or exiting vehicle 3, controller 30*c* determines whether vehicle 3 is driving or the driver is entering or exiting vehicle 3 according to the position of connecting portion 13 as detected by position sensor 60. In other words, a configuration is adopted that allows for positioning via, for example, a detent mechanism, whereby connecting portion 13 can be positioned toward the ceiling relative to spoke 2, tilted slightly toward the front windshield during driving, and connecting portion 13 can be positioned toward the ceiling relative to spoke 2, tilted slightly toward the seat while the driver enters or exits vehicle 3. This makes it possible for controller 30*c* to determine whether vehicle 3 is driving or the driver is entering or exiting vehicle 3 based on the output from position sensor 60.

Stopper 80 is electrically connected to controller 30*c* and restricts movement of table 50. Stopper 80 can, under control by controller 30*c*, restrict movement of table 50 and unrestrict movement of table 50. When stopper 80 is unlocked, it outputs a signal indicating that it is unlocked to controller 30*c*. When stopper 80 is locked, it outputs a signal indicating that it is locked to controller 30*c*.

When controller 30*c* has output the parked signal, controller 30*c* unlocks stopper 80 that restricts movement of table 50 toward the rear of vehicle 3. In other words, the driver may want to deploy table 50 stored in storage space S in column cover 6 while vehicle 3 is parked, so controller 30*c* unlocks stopper 80.

Upon outputting a ready-to-drive signal or a door unlock authorization signal, if stopper 80 is unlocked, controller 30*c* causes alerter 70 to output an alert prompting storage of table 50.

Operation Example 7

Next, an operation example of vehicle steering apparatus 1*c* will be described with reference to FIG. 11.

Figure 11:
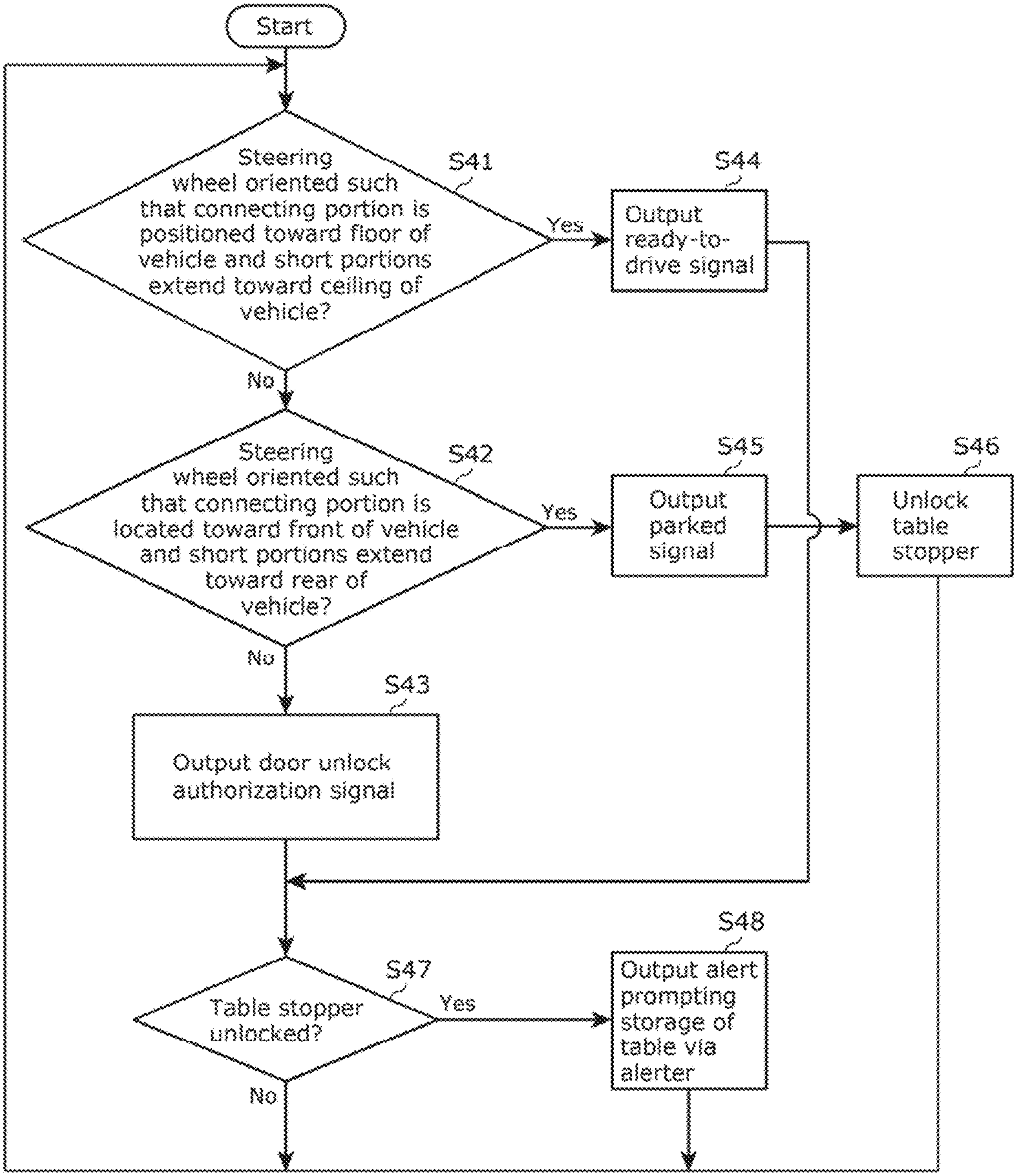
FIG. 11 is a flowchart illustrating a vehicle steering apparatus including a manually rotatable steering wheel.

FIG. 11 is a flowchart illustrating vehicle steering apparatus 1*c* including the manually rotatable steering wheel 100. The following description pertains to a case where, while driving, connecting portion 13 of steering wheel 100 is positioned toward the floor of vehicle 3 relative to spoke 2.

First, controller 30*c* determines whether connecting portion 13 of steering wheel 100 is positioned toward the floor of vehicle 3 relative to spoke 2 and short portions 12*a* of steering wheel 100 extend toward the ceiling of vehicle 3 based on the rotational positions of steering wheel 100 detected by position sensor 60 (S41).

When controller 30*c* determines that steering wheel 100 is oriented such that connecting portion 13 is positioned toward the floor of vehicle 3 relative to spoke 2 and short portions 12*a* are extending toward the ceiling of vehicle 3 (Yes in S41), controller 30*c* outputs a ready-to-drive signal to the ECU (S44). With this, vehicle 3 is drivable. Controller 30*c* proceeds to step S47.

However, when controller 30*c* determines that steering wheel 100 is not oriented such that connecting portion 13 is positioned toward the floor of vehicle 3 relative to spoke 2 and short portions 12*a* are extending toward the ceiling of vehicle 3 (No in S41), controller 30*c* determines whether steering wheel 100 is oriented such that connecting portion 13 is positioned toward the front of vehicle 3 relative to spoke 2 and short portions 12*a* are extending toward the rear of vehicle 3 (S42).

When controller 30*c* determines that steering wheel 100 is oriented such that connecting portion 13 is positioned toward the front of vehicle 3 relative to spoke 2 and short portions 12*a* are extending toward the rear of vehicle 3 (Yes in S42), controller 30*c* outputs a parked signal (S45).

Next, when controller 30*c* has output the parked signal, controller 30*c* controls stopper 80 that restricts movement of table 50 toward the rear of vehicle 3 so as to unlock stopper 80 (S46). Controller 30*c* then returns to step S41.

In step S42 described above, when controller 30*c* determines that steering wheel 100 is not oriented such that connecting portion 13 is positioned toward the front of vehicle 3 relative to spoke 2 and short portions 12*a* are extending toward the rear of vehicle 3 (No in S42), as this state is neither (a) nor (b) in FIG. 7, controller 30*c* determines it to be state (c) in FIG. 7, and outputs a door unlock authorization signal to the ECU (S43).

Next, controller 30*c* determines whether stopper 80 is unlocked or not (S47).

When controller 30*c* determines that stopper 80 is not unlocked (No in S47), it returns to step S41.

When controller 30*c* determines that stopper 80 is unlocked (Yes in S47), controller 30*c* causes alerter 70 to output an alert prompting storage of table 50 (S48). Controller 30*c* then returns to step S41.

Although this variation of the present embodiment presents an example in which vehicle steering apparatus 1*c* includes table 50, vehicle steering apparatus 1*c* is not required to include table 50.

Other Variations

For example, in the embodiment, the lengths of the first portion and the second portion may be the same. In such cases, for example, short portion 12*a* is referred to as the first portion or second portion, and long portion 11*a* is referred to as second portion or the first portion.

Figure 12:
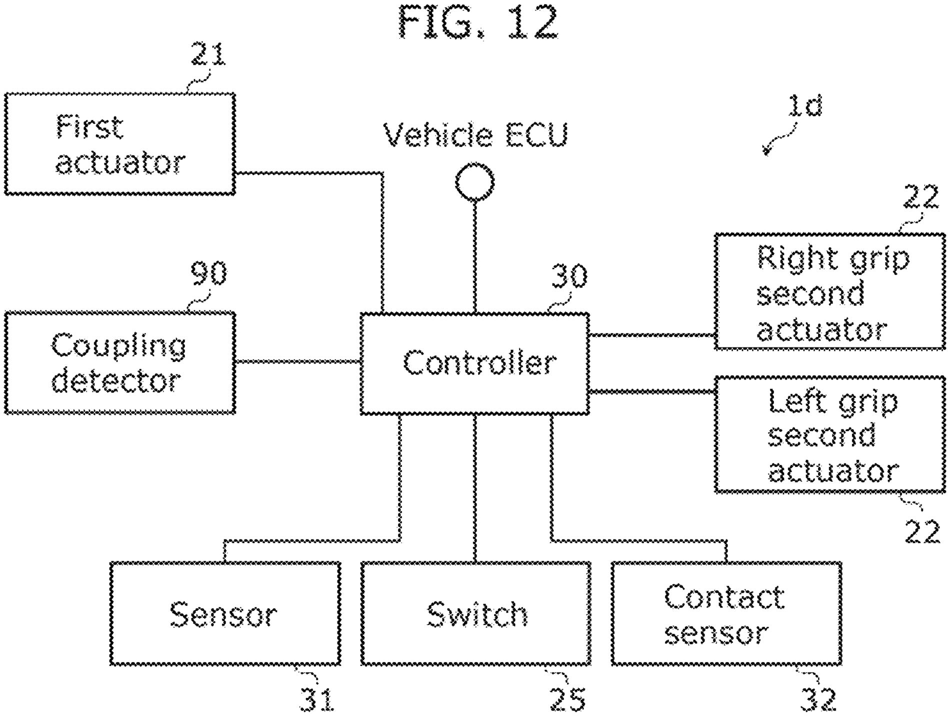
FIG. 12 is a block diagram illustrating a vehicle steering apparatus according to another variation.

In the above embodiment, vehicle steering apparatus 1*d* may have the configuration illustrated in FIG. 12. FIG. 12 is a block diagram illustrating vehicle steering apparatus 1*d* according to another variation. In the configuration of FIG. 12, vehicle steering apparatus 1*d* does not include stopper 80.

As illustrated in FIG. 12, vehicle steering apparatus 1*d* further includes coupling detector 90 that detects coupling between a tongue of a seat belt provided in vehicle 3 and a buckle provided on the driver's seat. When coupling detector 90 detects coupling between the tongue and the buckle, coupling detector 90 outputs a signal indicating that the tongue and the buckle are coupled to controller 30. In such cases, as illustrated in (a) in FIG. 1, controller 30 controls the pair of second actuators 22 such that either long portions 11*a* or short portions 12*a* of the pair of grips 10 extend toward the ceiling of vehicle 3. Moreover, as illustrated in (a) in FIG. 7, controller 30*b* controls third actuator 23 so as to position connecting portion 13 of steering wheel 100 toward the floor of vehicle 3 relative to spoke 2.

When coupling detector 90 detects that the tongue and the buckle have been decoupled, coupling detector 90 outputs a signal indicating that the tongue and the buckle are decoupled to controller 30. In such cases, as illustrated in (b) in FIG. 1, controller 30 controls the pair of second actuators 22 such that long portions 11*a* of the pair of grips 10 extend toward the front of vehicle 3 and short portions 12*a* of the pair of grips 10 extend toward the rear of vehicle 3. Moreover, as illustrated in (b) in FIG. 7, controller 30*b* controls third actuator 23 so as to position connecting portion 13 of steering wheel 100 toward the front of vehicle 3 relative to spoke 2.

Figure 13:
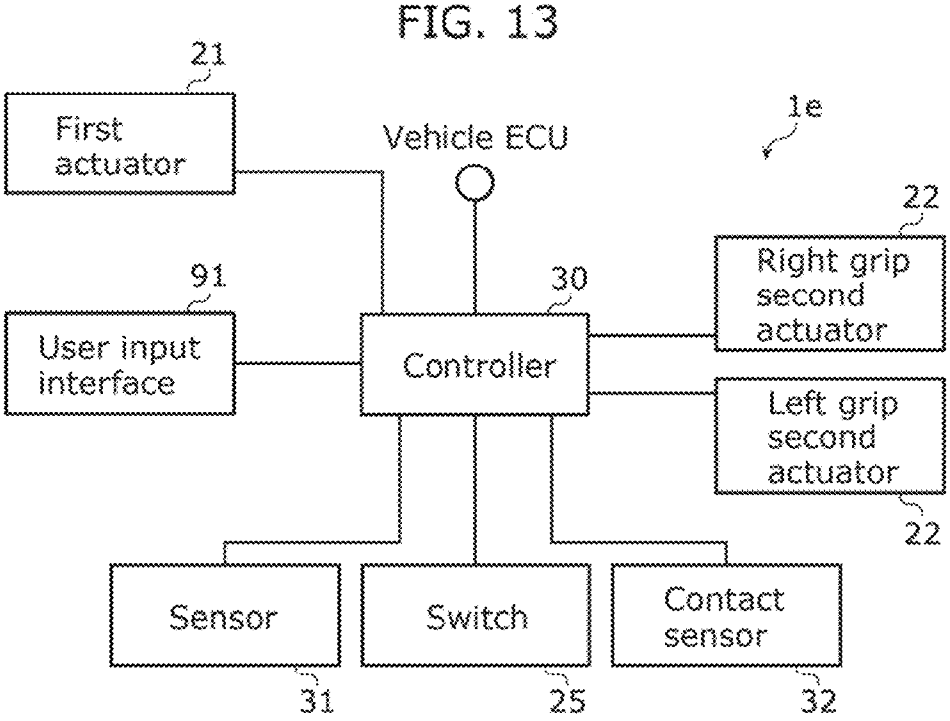
FIG. 13 is another block diagram illustrating a vehicle steering apparatus according to another variation.

In the above embodiment, vehicle steering apparatus 1*e* may have the configuration illustrated in FIG. 13. FIG. 13 is another block diagram illustrating vehicle steering apparatus 1*e* according to another variation. In the configuration of FIG. 13, vehicle steering apparatus 1*e* does not include stopper 80.

As illustrated in FIG. 13, vehicle steering apparatus 1*e* further includes user input interface 91 that the driver can operate to make an input. User input interface 91 is, for example, a capacitive touch pad. User input interface 91 is provided on the end face of short portion 12*a* on each grip 10. Note that user input interface 91 may be provided on either one of the pair of grips 10, and, alternatively, may be provided on both of the pair of grips 10.

Advantageous Effects

Next, the advantageous effects achieved by vehicle steering apparatuses 1, 1*a*, 1*b*, 1*c*, 1*d*, and 1*e* according to the above embodiment, variations thereof, and other variations thereof, will be described.

However, with the vehicle steering apparatus of PTL 1, even if it is possible to expand the foot space in front of the driver's seat, a lateral movement mechanism must be provided to move the steering wheel from the operative position to the evasive position, resulting in a more complex structure around the steering wheel.

Vehicle steering apparatus 1, 1*a*, 1*b*, 1*c*, 1*d*, and 1*e* according Technique 1 of the present embodiment and the like includes: spoke 2 of steering wheel 100 of vehicle 3; a pair of grips 10, one of which is disposed on a left portion of spoke 2 and another of which is disposed on a right portion of spoke 2, each shaped in an arc or straight line; table 50 storable in column cover 6 that covers a bottom of steering column 4; sensor 31 provided on table 50; first actuator 21 that actuates table 50 to move table 50 from steering column 4 toward the rear of vehicle 3 to deploy table 50 from column cover 6, and actuates table 50 to move table 50 toward the front of vehicle 3 to store table 50 in column cover 6; and controller 30, 30*a*, 30*b*, or 30*c* that controls first actuator 21. The pair of grips 10 are rotatable relative to spoke 2. Controller 30, 30*a*, 30*b*, or 30*c*: controls actuation of first actuator 21 to move table 50 from steering column 4 toward the rear of vehicle 3 when vehicle 3 is parked; controls actuation of first actuator 21 to move table 50 toward the front of vehicle 3 to store table 50 in column cover 6 during driving of vehicle 3 or when a driver enters or exits vehicle 3; and does not actuate first actuator 21 when sensor 31 detects an object placed on table 50.

This configuration allows the pair of grips 10 to rotatable relative to spoke 2, which makes it possible to expand the space in front of the driver sitting in the driver's seat by rotating the pair of grips 10. Accordingly, unlike the vehicle steering apparatus according to PTL 1 described above, there is no need to provide a lateral movement mechanism for laterally moving the steering wheel from in front of the driver's seat to in front of the passenger's seat.

Accordingly, the foot space in front of the driver's seat can be expanded and the structure in the surrounding area of the steering wheel can be simplified.

Furthermore, when vehicle 3 is parked, table 50 automatically deploys to a position in front of the driver. Therefore, there is no need for the driver to take any special measures to use table 50. This improves convenience for the driver.

Vehicle steering apparatus 1, 1*a*, 1*b*, 1*c*, 1*d*, and 1*e* according to Technique 2 of the present embodiment and the like is vehicle steering apparatus 1, 1*a*, 1*b*, 1*c*, 1*d*, and 1*e* according to Technique 1, further including alerter 70 that outputs an alert. When sensor 31 detects an object placed on table 50, controller 30, 30*a*, 30*b*, or 30*c* causes alerter 70 to output an alert indicating that an object is placed on table 50, without actuating first actuator 21.

With this, it is possible to detect an object placed on table 50, and thus it is possible to output an alert indicating that an object is placed on table 50. The driver can recognize that an object is placed on table 50, and thus can take measures such as removing the object from table 50. As a result, it is possible to inhibit the object from falling off table 50 due to movement of table 50.

Vehicle steering apparatus 1, 1*a*, 1*b*, 1*c*, 1*d*, and 1*e* according to Technique 3 of the present embodiment and the like is vehicle steering apparatus 1, 1*a*, 1*b*, 1*c*, 1*d*, and 1*e* according to Technique 2, wherein when an output of sensor 31 is greater than or equal to a predetermined output, controller 30, 30*a*, 30*b*, or 30*c* causes alerter 70 to output an alert indicating that the output is greater than or equal to the predetermined output.

With this, it is possible to detect a heavy object placed on table 50, and thus it is possible to output an alert indicating that a heavy object is placed on table 50. This allows the driver to recognize that the object placed on table 50 is too heavy. This allows the driver to take measures such as removing the heavy object placed on table 50 from table 50. It is thus possible to inhibit damage to table 50.

Vehicle steering apparatus 1, 1*a*, 1*b*, 1*c*, 1*d*, and 1*e* according to Technique 4 of the present embodiment and the like is vehicle steering apparatus 1, 1*a*, 1*b*, 1*c*, 1*d*, and 1*e* according to Technique 3, wherein sensor 31 is a weight sensor, and when the output of the weight sensor indicates greater than or equal to a predetermined weight, controller 30, 30*a*, 30*b*, or 30*c* causes alerter 70 to output an alert indicating that the object is a heavy object.

With this, it is possible to accurately detect a heavy object placed on table 50, and thus it is possible to output an alert indicating that a heavy object is placed on table 50. This allows the driver to recognize that the object placed on table 50 is too heavy. This allows the driver to take measures such as removing the heavy object placed on table 50 from table 50. It is thus possible to inhibit damage to table 50.

Vehicle steering apparatus 1, 1*a*, 1*b*, 1*c*, 1*d*, and 1*e* according to Technique 5 of the present embodiment and the like is vehicle steering apparatus 1, 1*a*, 1*b*, 1*c*, 1*d*, and 1*e* according to any one of Techniques 1 to 4, further including switch 25 that outputs an instruction to controller 30, 30*a*, 30*b*, or 30*c*. Controller 30, 30*a*, 30*b*, or 30*c*: controls actuation of first actuator 21 to move table 50 toward the front of vehicle 3 to store table 50 in column cover 6 when a storage instruction is output from switch 25; and controls actuation of first actuator 21 to move table 50 from steering column 4 toward the rear of vehicle 3 to deploy table 50 from column cover 6 when a deploy instruction is output from switch 25.

With this, for example, even if table 50 does not move due to false detection or malfunction of sensor 31 or the like, the driver can operate switch 25 to deploy table 50 from column cover 6 or store table 50 in column cover 6.

Vehicle steering apparatus 1, 1*a*, 1*b*, 1*c*, 1*d*, and 1*e* according to Technique 6 of the present embodiment and the like is vehicle steering apparatus 1, 1*a*, 1*b*, 1*c*, 1*d*, and 1*e* according to any one of Techniques 1 to 5, further including: contact sensor 32 that detects contact between an object and table 50. When table 50 is actuated to move table 50 from steering column 4 toward the rear of vehicle 3 to deploy table 50 from column cover 6 and contact sensor 32 detects contact with table 50, controller 30, 30*a*, 30*b*, or 30*c* stops actuation of first actuator 21 or controls actuation of first actuator 21 to move table 50 toward the front of vehicle 3 to store table 50 in column cover 6.

With this, it is possible to prevent forced deployment of table 50 if table 50 comes into contact with some obstacle when table 50 is being deployed from column cover 6. It is therefore possible to inhibit the load on first actuator 21 including a drive mechanism such as an electric motor, and to inhibit damage to table 50 and obstacles.

Vehicle steering apparatus 1, 1*a*, 1*b*, 1*c*, 1*d*, and 1*e* according to Technique 7 of the present embodiment and the like is vehicle steering apparatus 1, 1*a*, 1*b*, 1*c*, 1*d*, and 1*e* according to any one of Techniques 2 to 4, wherein when an object placed on table 50 has not been removed after alerter 70 outputs an alert, controller 30, 30*a*, 30*b*, or 30*c* does not actuate first actuator 21.

With this, even if an alert is output, it is possible to prevent storage of table 50 in column cover 6 while an object remains placed on table 50. This makes it possible to inhibit an object placed on table 50 from falling off when table 50 is stored.

In this case, by causing alerter 70 to perform an alert again, it becomes easier for the driver to recognize that an object is placed on table 50.

Vehicle steering apparatus 1, 1*a*, 1*b*, 1*c*, 1*d*, and 1*e* according to Technique 8 of the present embodiment and the like is vehicle steering apparatus 1, 1*a*, 1*b*, 1*c*, 1*d*, and 1*e* according to any one of Techniques 1 to 7, wherein when sensor 31 detects an object placed on table 50 when the driver enters or exits vehicle 3 and, controller 30, 30*a*, 30*b*, or 30*c* does not actuate first actuator 21.

With this, storage of table 50 in column cover 6 can be prevented if an object is placed on table 50 when the driver enters or exits vehicle 3. This makes it possible to inhibit an object placed on table 50 from falling off when table 50 is stored.

Vehicle steering apparatus 1, 1*a*, 1*d*, and 1*e* according to Technique 9 of the present embodiment and the like is vehicle steering apparatus 1, 1*a*, 1*d*, and 1*e* according to any one of Techniques 1 to 8, wherein each of the pair of grips 10 are separated and independently rotatable on the left portion and right portion of spoke 2.

This makes it possible to freely adjust the orientations of each of left and right grips 10, thereby making it possible to adjust the size of the space in front of the driver sitting in the driver's seat.

Vehicle steering apparatus 1, 1*a*, 1*d*, and 1*e* according to Technique 10 of the present embodiment and the like is vehicle steering apparatus 1, 1*a*, 1*d*, and 1*e* according to Technique 9, wherein in each grip in the pair of grips 10, when a steering position during driving of vehicle 3 by the driver is in a neutral position, a length of a first portion extending toward the ceiling of vehicle 3 relative to spoke 2 differs from a length of a second portion extending toward the floor of vehicle 3 relative to spoke 2.

With this, since the length of the first portion is different from the length of the second portion, for example, if short portions 12*a* are positioned to extend toward the driver, long portions 11*a* can be positioned to extend in the opposite direction, which increases the space between the driver and the steering wheel. In particular, positioning short portions 12*a* so as to extend toward the driver when parked makes it easier for the driver to enter and exit vehicle 3.

Vehicle steering apparatus 1, 1*a*, 1*d*, and 1*e* according to Technique 11 of the present embodiment and the like is vehicle steering apparatus 1, 1*a*, 1*d*, and 1*e* according to Technique 10, wherein each grip in the pair of grips 10 is rotatable to an orientation in which short portion 12*a* is positioned toward the rear of vehicle 3 relative to spoke 2 and long portion 11*a* is positioned toward the front of vehicle 3 relative to spoke 2 when vehicle 3 is parked, short portion 12*a* being a shorter of the first portion and the second portion, long portion 11*a* being a longer of the first portion and the second portion.

With this, when parked, by rotating the pair of grips 10 so that long portions 11*a* are positioned toward the front of vehicle 3 relative to spoke 2 and short portions 12*a* are positioned toward the driver relative to spoke 2, the space around the driver's legs can be increased.

Vehicle steering apparatus 1, 1*a*, 1*d*, and 1*e* according to Technique 12 of the present embodiment and the like is vehicle steering apparatus 1, 1*a*, 1*d*, and 1*e* according to Technique 11, wherein the pair of grips 10 are independently rotatable, and grip 10 among the pair of grips 10 that is adjacent to door 9, of vehicle 3, that is adjacent to vehicle steering apparatus 1, 1*a*, 1*d*, or 1*e*, is placed in an orientation in which long portion 11*a* extends toward the ceiling of vehicle 3 and short portion 12*a* extends toward the floor of vehicle 3 when the driver enters or exits vehicle 3.

The space in front of the driver's seat of a vehicle is usually smaller than the space in front of the passenger's seat since a steering wheel is provided in front of the driver's seat. This makes getting in and out of the driver's seat more difficult compared to other seats.

However, according to the present embodiment and the like, the driver can get into and out of the driver's seat of vehicle 3 while holding long portion 11*a* of the grip adjacent to door 9 of vehicle 3. This makes it easier for the driver to get into and out of the driver's seat.

Vehicle steering apparatus 1, 1*d*, and 1*e* according to Technique 13 of the present embodiment and the like is vehicle steering apparatus 1, 1*d*, and 1*e* according to Technique 11 or 12, further including the pair of grips 10; and a pair of second actuators 22 that rotate the pair of grips 10. In each grip 10 the pair of grips 10, when the steering position during driving of vehicle 3 is in the neutral position, the length of the first portion extending toward the ceiling of vehicle 3 relative to spoke 2 differs from the length of the second portion extending toward the floor of vehicle 3 relative to spoke 2. Controller 30: controls the pair of second actuators 22 to place each grip 10 in the pair of grips 10 in an orientation in which one of long portion 11*a* or short portion 12*a* extends toward the ceiling of vehicle 3 relative to spoke 2 when vehicle 3 is being driven manually; controls the pair of second actuators 22 to place each grip 10 in the pair of grips 10 in an orientation in which short portion 12*a* extends toward the rear of vehicle 3 relative to spoke 2 and long portion 11*a* extends toward the front of vehicle 3 relative to spoke 2 when vehicle 3 is parked or vehicle 3 is driving autonomously; and controls the pair of second actuators 22 to place a grip 10 among the pair of grips 10 that is adjacent to door 9, of vehicle 3, that is adjacent to vehicle steering apparatus 1, 1*d*, or 1*e* in an orientation in which long portion 11*a* extends toward the ceiling of vehicle 3 relative to spoke 2 and short portion 12*a* extends toward the floor of vehicle 3 relative to spoke 2 when the driver enters or exits vehicle 3.

With this, since the rotational positions of grips 10 automatically change according to the state of vehicle 3, such as during driving, while parked, or while a driver is entering or exiting vehicle 3, there is no need for the driver to take any special measures to rotate the pair of grips 10. This improves convenience for the driver.

Vehicle steering apparatus 1*a*, 1*d*, and 1*e* according to Technique 14 of the present embodiment and the like is vehicle steering apparatus 1*a*, 1*d*, and 1*e* according to Technique 12, further including a pair of position sensors 60 that detect the rotational position of each grip 10 in the pair of grips 10. Each grip 10 in the pair of grips 10 is manually rotatable. Controller 30 or 30*a* is electrically connected to the pair of position sensors 60, and when controller 30 or 30*a* determines that long portion 11*a* or short portion 12*a* of the pair of grips 10 is extending toward the ceiling of vehicle 3 based on the rotational positions of the pair of grips 10 detected by the pair of position sensors 60, outputs a ready-to-drive signal; when controller 30 or 30*a* determines that short portion 12*a* of the pair of grips 10 is oriented toward the rear of vehicle 3 and long portion 11*a* of the pair of grips 10 is extending toward the front of vehicle 3 based on the rotational positions of the pair of grips 10 detected by the pair of position sensors 60, outputs a parked signal; and when controller 30 or 30*a* determines that long portion 11*a* of the grip positioned adjacent door 9 is oriented toward the ceiling of vehicle 3 and short portion 12*a* of the grip positioned adjacent door 9 is extending toward the floor of vehicle 3 based on the rotational positions of the pair of grips 10 detected by the pair of position sensors 60, outputs a door unlock authorization signal.

With this, various signals are output to the ECU according to the position of the grips, so the ECU can control the vehicle appropriately according to the signals.

Vehicle steering apparatus 1*a*, 1*d*, and 1*e* according to Technique 15 of the present embodiment and the like is vehicle steering apparatus 1, 1*a*, 1*d*, and 1*e* according to Technique 14, further including stopper 80 that is electrically connected to controller 30 or 30*a* and restricts movement of table 50. When controller 30 or 30*a* has output the parked signal, controller 30 or 30*a* unlocks stopper 80.

With this, since table 50 is permitted to deploy only when vehicle 3 is parked, a reduction in safety while vehicle 3 is driving can be inhibited, and an improvement in convenience in regard to usage of table 50 only while parked can be achieved.

Vehicle steering apparatus 1*a*, 1*d*, and 1*e* according to Technique 16 of the present embodiment and the like is vehicle steering apparatus 1*a*, 1*d*, and 1*e* according to Technique 15, further including alerter 70 that outputs an alert, wherein upon outputting a ready-to-drive signal or a door unlock authorization signal, if stopper 80 is unlocked, controller 30 or 30*a* causes alerter 70 to output an alert prompting storage of table 50.

With this, the driver can be alerted if table 50 is deployed from storage space S in column cover 6 when starting to drive and when starting to enter or exit vehicle 3. This makes it possible to prompt the driver to store table 50 in storage space S in column cover 6. This consequently inhibits a reduction in safety when driving vehicle 3 and when entering or exiting vehicle 3.

Vehicle steering apparatus 1*b*, 1*c*, 1*d*, and 1*e* according to Technique 17 of the present embodiment and the like is vehicle steering apparatus 1*b*, 1*c*, 1*d*, and 1*e* according to Technique 1, wherein the pair of grips 10 are configured as steering wheel 100 characterized by one of corresponding ends of the pair of grips 10 being integrally connected, and steering wheel 100 is rotatable to position connecting portion 13 of steering wheel 100 connecting the pair of grips 10 toward the front of vehicle 3 relative to spoke 2 when vehicle 3 is parked.

With this, when parked, by rotating steering wheel 100 so that connecting portion 13 is positioned toward the front of vehicle 3 relative to spoke 2 and short portions 12*a*, which are on the opposite side relative to connecting portion 13, are positioned toward the driver relative to spoke 2, the space around the driver's legs can be increased.

Vehicle steering apparatus 1*b*, 1*c*, 1*d*, and 1*e* according to Technique 18 of the present embodiment and the like is vehicle steering apparatus 1*b*, 1*c*, 1*d*, and 1*e* according to Technique 17, wherein steering wheel 100 is positioned such that connecting portion 13 is positioned toward the ceiling of vehicle 3 relative to spoke 2 when the driver enters or exits vehicle 3.

The space in front of the driver's seat of vehicle 3 is usually smaller than the space in front of the passenger's seat since a steering wheel is provided in front of the driver's seat. This makes getting in and out of the driver's seat more difficult compared to other seats.

However, according to the present embodiment and the like, the driver can get into and out of the driver's seat of vehicle 3 while holding connecting portion 13 of vehicle 3. This makes it easier for the driver to get into and out of the driver's seat.

Vehicle steering apparatus 1*b*, 1*d*, and 1*e* according to Technique 19 of the present embodiment and the like is vehicle steering apparatus 1*b*, 1*d*, and 1*e* according to Technique 18, further including third actuator 23 for rotating steering wheel 100. Controller 30 or 30*b* controls third actuator 23 to position connecting portion 13 of steering wheel 100 toward the floor of vehicle 3 relative to spoke 2 when the driver is manually driving vehicle 3; controls third actuator 23 to position connecting portion 13 of steering wheel 100 toward the front of vehicle 3 relative to spoke 2 when vehicle 3 is parked or vehicle 3 is driving autonomously; and controls third actuator 23 to position connecting portion 13 of steering wheel 100 toward the ceiling of vehicle 3 relative to spoke 2 when the driver enters or exits vehicle 3.

With this, since the rotational position of steering wheel 100 automatically changes according to the state of vehicle 3, such as during driving, while parked, or while a driver is entering or exiting vehicle 3, there is no need for the driver to take any special measures to rotate steering wheel 100. This improves convenience for the driver.

Vehicle steering apparatus 1*b*, 1*d*, and 1*e* according to Technique 20 of the present embodiment and the like is vehicle steering apparatus 1*b*, 1*d*, and 1*e* according to Technique 19, wherein controller 30 or 30*b* control first actuator 21 to move table 50 from steering column 4 toward the rear of vehicle 3 when parked, and while driving or when the driver is entering or exiting vehicle 3, first actuator 21 is controlled to move table 50 toward the front of vehicle 3 so as to store table 50 in storage space S in column cover 6.

With this, when vehicle 3 is parked, table 50 automatically deploys to a position in front of the driver. Therefore, there is no need for the driver to take any special measures to use table 50. This improves convenience for the driver.

Vehicle steering apparatus 1*c*, 1*d*, and 1*e* according to Technique 21 of the present embodiment and the like is vehicle steering apparatus 1*c*, 1*d*, and 1*e* according to Technique 18, further including position sensor 60 that detects the rotational position of steering wheel 100. Steering wheel 100 is manually rotatable. Controller 30 or 30*c* is electrically connected to position sensor 60, and when controller 30 or 30*c* determines, based on the rotational position of steering wheel 100 detected by position sensor 60, that steering wheel 100 is in an orientation in which connecting portion 13 is positioned toward the floor of vehicle 3 relative to spoke 2, outputs a ready-to-drive signal;

when controller 30 or 30*c* determines, based on the rotational position of steering wheel 100 detected by position sensor 60, that steering wheel 100 is in an orientation in which connecting portion 13 is positioned toward the front of vehicle 3 relative to spoke 2, outputs a parked signal; and when controller 30 or 30*c* determines, based on the rotational position of steering wheel 100 detected by position sensor 60, that steering wheel 100 is in an orientation in which connecting portion 13 is positioned toward the ceiling of vehicle 3 relative to spoke 2, outputs a door unlock authorization signal.

With this, various signals are output to the ECU according to the position of steering wheel 100, so the ECU can control vehicle 3 appropriately according to the signals.

Vehicle steering apparatus 1*c*, 1*d*, and 1*e* according to Technique 22 of the present embodiment and the like is vehicle steering apparatus 1*c*, 1*d*, and 1*e* according to Technique 21, further including stopper 80 that is electrically connected to controller 30 or 30*c* and restricts movement of table 50. When controller 30 or 30*c* has output the parked signal, controller 30 or 30*c* unlocks stopper 80.

With this, since table 50 is permitted to deploy only when vehicle 3 is parked, a reduction in safety while vehicle 3 is driving can be inhibited, and an improvement in convenience in regard to usage of table 50 only while parked can be achieved.

Vehicle steering apparatus 1*c*, 1*d*, and 1*e* according to Technique 23 of the present embodiment and the like is vehicle steering apparatus 1*c*, 1*d*, and 1*e* according to Technique 22, further including alerter 70 that outputs an alert, wherein upon outputting a ready-to-drive signal or a door unlock authorization signal, if stopper 80 is unlocked, controller 30 or 30*c* causes alerter 70 to output an alert prompting storage of table 50.

With this, the driver can be alerted if table 50 is deployed from storage space S in column cover 6 when starting to drive and when starting to enter or exit vehicle 3. This makes it possible to prompt the driver to store table 50 in storage space S in column cover 6. This consequently inhibits a reduction in safety when driving vehicle 3 and when entering or exiting vehicle 3.

Vehicle steering apparatus 1, 1*a*, 1*b*, 1*c*, 1*d*, and 1*e* according to Technique 24 of the present embodiment and the like is vehicle steering apparatus 1, 1*a*, 1*b*, 1*c*, 1*d*, and 1*e* according to any one of Techniques 1 to 23, wherein table 50 further includes input interface 51.

This makes it easy to operate a display on table 50 in vehicle 3.

Vehicle steering apparatus 1, 1*a*, 1*b*, 1*c*, 1*d*, and 1*e* according to Technique 25 of the present embodiment and the like is vehicle steering apparatus 1, 1*a*, 1*b*, 1*c*, 1*d*, and 1*e* according to Technique 24, wherein input interface 51 is a touch pad, a touch panel, or a projection keyboard.

With this, the driver can use input interface 51 on table 50 to make an input, and the flat top surface table 50 can be used as a table when input interface 51 is not being used.

Vehicle steering apparatus 1, 1*a*, 1*d*, and 1*e* according to Technique 26 of the present embodiment and the like is vehicle steering apparatus 1, 1*a*, 1*d*, and 1*e* according to any one of Techniques 1 to 25, further including coupling detector 90 that detects coupling between a tongue of a seat belt provided in vehicle 3 and a buckle provided for a seat of a driver, and is electrically connected to controller 30 or 30*a*. Each grip 10 in the pair of grips 10 includes long portion 11*a* and short portion 12*a*, long portion 11*a* being longer than short portion 12*a*, short portion 12*a* being shorter than long portion 11*a*. When coupling detector 90 detects the coupling between the tongue and the buckle, controller 30 or 30*a* controls a pair of second actuators 22 to place each grip 10 in the pair of grips 10 in an orientation in which one of long portion 11*a* or short portion 12*a* extends toward the ceiling of vehicle 3 relative to spoke 2. When coupling detector 90 detects decoupling between the tongue and the buckle, controller 30 or 30*a* controls the pair of second actuators 22 to place each grip 10 in the pair of grips 10 in an orientation in which long portion 11*a* extends toward the front of vehicle 3 relative to spoke 2 and short portion 12*a* extends toward the rear of vehicle 3 relative to spoke 2.

With this, since vehicle 3 cannot be driven unless the driver and other passengers buckle their seatbelts, it is possible to force the driver and other passengers to buckle their seatbelts.

Vehicle steering apparatus 1*b*, 1*c*, 1*d*, and 1*e* according to Technique 27 of the present embodiment and the like is vehicle steering apparatus 1*b*, 1*c*, 1*d*, and 1*e* according to Technique 19 or 20, further including coupling detector 90 that detects coupling between a tongue of a seat belt provided in vehicle 3 and a buckle provided for a seat of a driver, and is electrically connected to controller 30 or 30*a*. When coupling detector 90 detects coupling between the tongue and the buckle, controller 30 or 30*b* controls third actuator 23 so as to position connecting portion 13 of steering wheel 100 toward the floor of vehicle 3 relative to spoke 2. When coupling detector 90 detects decoupling between the tongue and the buckle, controller 30 or 30*b* controls third actuator 23 so as to position connecting portion 13 of steering wheel 100 toward the front of vehicle 3 relative to spoke 2.

With this, since vehicle 3 cannot be driven unless the driver and other passengers buckle their seatbelts, it is possible to force the driver and other passengers to buckle their seatbelts.

Vehicle steering apparatus 1, 1*a*, 1*b*, 1*c*, 1*d*, and 1*e* according to Technique 28 of the present embodiment and the like is vehicle steering apparatus 1, 1*a*, 1*b*, 1*c*, 1*d*, and 1*e* according to any one of Techniques 1 to 27, further comprising user input interface 91, provided on at least one end portion of the pair of grips 10 (steering wheel 100), operable by a driver to make an input.

With this, the driver can make an input via the user input interface while holding the pair of grips 10 (steering wheel 100). This improves operability of in-vehicle devices for the driver.

In particular, when user input interface 91 is provided on the end portion of short portion 12*a*, the driver can operate user input interface 91 on short portion 12*a* using their fingers while holding the grip. User input interface 91 is, for example, a capacitive touch pad. If vehicle 3 is parked or autonomously driving, in addition to in-vehicle devices, devices operable via user input interface 91 may include, for example, a smartphone or gaming device communicably connected to controller 30, 30*a*, 30*b*, or 30*c*.

Other Remarks

Hereinbefore, the vehicle steering apparatus according to the present disclosure has been described based on the above embodiment, variations thereof, and other variations thereof, but the present disclosure is not limited to these. Various modifications to the embodiment, etc., that may be conceived by those skilled in the art are also intended to be included within the scope of the present disclosure as long as they do not depart from the essence of the present disclosure.

In the above embodiment, variations thereof, and other variations thereof, all or part of the elements such as the controller may be configured using dedicated hardware, or may be implemented by executing a software program suitable for each element. Each element may be implemented by a program execution unit such as a central processing unit (CPU) or processor reading and executing a software program recorded on a recording medium such as a hard disk drive (HDD) or semiconductor memory.

Moreover, the division of the function blocks in the block diagrams are mere examples. A plurality of function blocks may be realized as a single function block, a single function block may be divided into a plurality of function blocks, or a portion of functions of one block may be transferred to a different function block. A plurality of function blocks which share similar functions can be processed by standalone hardware or software in parallel or time-shared.

The order in which the steps are executed in the flow charts are mere examples presented for illustrative purposes; the steps may be executed in a different order. Moreover, some of the steps may be executed at the same time as (in parallel with) other steps.

Embodiments arrived at by a person skilled in the art making various modifications to any one of the above embodiment, variations thereof, and other variations thereof, as well as embodiments realized by arbitrarily combining elements and functions in the above embodiment, variations thereof, and other variations thereof, which do not depart from the essence of the present disclosure are included in the present disclosure.

Further Information about Technical Background to this Application

The disclosures of the following patent applications including specification, drawings and claims are incorporated herein by reference in their entirety: Japanese Patent Application No. 2024-125179 filed on Jul. 31, 2024.

INDUSTRIAL APPLICABILITY

The vehicle steering apparatus according to the present disclosure is applicable to steering wheels in vehicles.

The invention claimed is:

1. A vehicle steering apparatus comprising:
a spoke of a steering wheel of a vehicle;
a pair of grips, one of which is disposed on a left portion of the spoke and another of which is disposed on a right portion of the spoke, each shaped in an arc or straight line;
a table storable in a column cover that covers a bottom of a steering column;
a sensor provided on the table;
a first actuator that actuates the table to move the table from the steering column toward a rear of the vehicle to deploy the table from the column cover, and actuates the table to move the table toward a front of the vehicle to store the table in the column cover; and
a controller that controls the first actuator, wherein
the pair of grips are rotatable relative to the spoke, and
the controller:
controls actuation of the first actuator to move the table from the steering column toward the rear of the vehicle when the vehicle is parked;
controls actuation of the first actuator to move the table toward the front of the vehicle to store the table in the column cover during driving of the vehicle or when a driver enters or exits the vehicle; and
does not actuate the first actuator when the sensor detects an object placed on the table.

2. The vehicle steering apparatus according to claim 1, further comprising:
an alerter that outputs an alert, wherein
when the sensor detects an object placed on the table, the controller causes the alerter to output an alert indicating that an object is placed on the table, without actuating the first actuator.

3. The vehicle steering apparatus according to claim 2, wherein
when an output of the sensor is greater than or equal to a predetermined output, the controller causes the alerter to output an alert indicating that the output is greater than or equal to the predetermined output.

4. The vehicle steering apparatus according to claim 3, wherein
the sensor is a weight sensor, and
when the output of the weight sensor indicates greater than or equal to a predetermined weight, the controller causes the alerter to output an alert indicating that the object is a heavy object.

5. The vehicle steering apparatus according to claim 2, wherein
when the sensor detects an object placed on the table after the alerter outputs an alert, the controller does not actuate the first actuator.

6. The vehicle steering apparatus according to claim 1, further comprising:
a switch that outputs an instruction to the controller, wherein
the controller:
controls actuation of the first actuator to move the table toward the front of the vehicle to store the table in the column cover when a storage instruction is output from the switch; and
controls actuation of the first actuator to move the table from the steering column toward the rear of the vehicle to deploy the table from the column cover when a deploy instruction is output from the switch.

7. The vehicle steering apparatus according to claim 1, further comprising:
a contact sensor that detects contact between an object and the table, wherein
when the table is actuated to move the table from the steering column toward the rear of the vehicle to deploy the table from the column cover and the contact sensor detects contact with the table, the controller stops actuation of the first actuator or controls actuation of the first actuator to move the table toward the front of the vehicle to store the table in the column cover.

8. The vehicle steering apparatus according to claim 1, wherein
when the sensor detects an object placed on the table when the driver enters or exits the vehicle, the controller does not actuate the first actuator.

9. The vehicle steering apparatus according to claim 1, wherein
the pair of grips are separated and independently rotatable on the left portion and the right portion of the spoke.

10. The vehicle steering apparatus according to claim 9, wherein
in each grip in the pair of grips, when a steering position during driving of the vehicle by the driver is in a neutral position, a length of a first portion extending toward a ceiling of the vehicle relative to the spoke differs from a length of a second portion extending toward a floor of the vehicle relative to the spoke.

11. The vehicle steering apparatus according to claim 10, wherein each grip in the pair of grips is rotatable to an orientation in which a short portion is positioned toward the rear of the vehicle relative to the spoke and a long portion is positioned toward the front of the vehicle relative to the spoke when the vehicle is parked, the short portion being the shorter of the first portion and the second portion, the long portion being the longer of the first portion and the second portion.

12. The vehicle steering apparatus according to claim 11, wherein the pair of grips are independently rotatable, and a grip among the pair of grips that is adjacent to a door, of the vehicle, that is adjacent to the vehicle steering apparatus, is placed in an orientation in which the long portion extends toward the ceiling of the vehicle and the short portion extends toward the floor of the vehicle when the driver enters or exits the vehicle.

13. The vehicle steering apparatus according to claim 11, further comprising:

the pair of grips; and a pair of second actuators that rotate the pair of grips, wherein in each grip in the pair of grips, when the steering position during driving of the vehicle is in the neutral position, the length of the first portion extending toward the ceiling of the vehicle relative to the spoke differs from the length of the second portion extending toward the floor of the vehicle relative to the spoke, and the controller:

controls the pair of second actuators to place each grip in the pair of grips in an orientation in which one of the long portion or the short portion extends toward the ceiling of the vehicle relative to the spoke when the vehicle is being driven manually;

controls the pair of second actuators to place each grip in the pair of grips in an orientation in which the short portion extends toward the rear of the vehicle relative to the spoke and the long portion extends toward the front of the vehicle relative to the spoke when the vehicle is parked or the vehicle is driving autonomously; and controls the pair of second actuators to place a grip among the pair of grips that is adjacent to a door, of the vehicle, that is adjacent to the vehicle steering apparatus in an orientation in which the long portion extends toward the ceiling of the vehicle relative to the spoke and the short portion extends toward the floor of the vehicle relative to the spoke when the driver enters or exits the vehicle.

14. The vehicle steering apparatus according to claim 1, wherein the pair of grips are configured as part of the steering wheel characterized by one of corresponding ends of the pair of grips being integrally connected, and the steering wheel is rotatable to position a connecting portion of the steering wheel connecting the pair of grips toward the front of the vehicle relative to the spoke when the vehicle is parked.

15. The vehicle steering apparatus according to claim 14, wherein when the driver enters or exits the vehicle, the connecting portion of the steering wheel is positioned toward a ceiling of the vehicle relative to the spoke.

16. The vehicle steering apparatus according to claim 15, further comprising:

a third actuator that rotates the steering wheel, wherein the controller:

controls the third actuator to position the connecting portion of the steering wheel toward a floor of the vehicle relative to the spoke when the driver is manually driving the vehicle;

controls the third actuator to position the connecting portion of the steering wheel toward the front of the vehicle relative to the spoke when the vehicle is parked or the vehicle is driving autonomously; and controls the third actuator to position the connecting portion of the steering wheel toward the ceiling of the vehicle relative to the spoke when the driver enters or exits the vehicle.

17. The vehicle steering apparatus according to claim 15, further comprising:

a position sensor that detects a rotational position of the steering wheel, wherein the steering wheel is manually rotatable, and the controller:

is electrically connected to the position sensor;

outputs a ready-to-drive signal when the controller determines, based on the rotational position of the steering wheel detected by the position sensor, that the steering wheel is in an orientation in which the connecting portion is positioned toward a floor of the vehicle relative to the spoke;

outputs a parked signal when the controller determines, based on the rotational position of the steering wheel detected by the position sensor, that the steering wheel is in an orientation in which the connecting portion is positioned toward the front of the vehicle relative to the spoke; and outputs a door unlock authorization signal when the controller determines, based on the rotational position of the steering wheel detected by the position sensor, that the steering wheel is in an orientation in which the connecting portion is positioned toward the ceiling of the vehicle relative to the spoke.

18. The vehicle steering apparatus according to claim 1, wherein the table further includes an input interface.

19. The vehicle steering apparatus according to claim 1, further comprising:

a detector for detecting a coupling of a seat belt, the detector being electrically connected to the controller, wherein each grip in the pair of grips includes a long portion and a short portion, the long portion being longer than the short portion, the short portion being shorter than the long portion, when the detector detects the coupling of the seat belt, the controller controls a pair of second actuators to place each grip in the pair of grips in an orientation in which one of the long portion or the short portion extends toward a ceiling of the vehicle relative to the spoke, and when the detector detects decoupling of the seatbelt, the controller controls the pair of second actuators to place each grip in the pair of grips in an orientation in which the long portion extends toward the front of the vehicle relative to the spoke and the short portion extends toward the rear of the vehicle relative to the spoke.

20. The vehicle steering apparatus according to claim 1, further comprising:

a user input interface operable by a driver to make an input.

* * * * *